United States Patent
Weber et al.

(10) Patent No.: US 10,421,356 B2
(45) Date of Patent: *Sep. 24, 2019

(54) SUSPENSION SYSTEM AND METHOD

(71) Applicant: BRIGGS & STRATTON CORPORATION, Wauwatosa, WI (US)

(72) Inventors: Steven J. Weber, Germantown, WI (US); Denis Oswald, Hartford, WI (US); Travis Rasch, Hustisford, WI (US); Erik Slegelis, Port Washington, WI (US); Mark J. Melone, Rome, NY (US); James F. Marshall, Munnsville, NY (US); Richard Smith, Morrisville, NY (US); Mark Lynch, Munnsville, NY (US)

(73) Assignee: BRIGGS & STRATTON CORPORATION, Milwaukee, WI (US)

( * ) Notice: Subject to any disclaimer, the term of this patent is extended or adjusted under 35 U.S.C. 154(b) by 175 days.

This patent is subject to a terminal disclaimer.

(21) Appl. No.: 15/465,213

(22) Filed: Mar. 21, 2017

(65) Prior Publication Data

US 2017/0259666 A1  Sep. 14, 2017

Related U.S. Application Data

(63) Continuation of application No. 13/889,024, filed on May 7, 2013, now Pat. No. 9,597,957, which is a
(Continued)

(51) Int. Cl.
*B60K 17/10* (2006.01)
*A01D 69/00* (2006.01)
(Continued)

(52) U.S. Cl.
CPC ............ *B60K 17/105* (2013.01); *A01D 34/64* (2013.01); *A01D 67/00* (2013.01); *A01D 69/00* (2013.01);
(Continued)

(58) Field of Classification Search
CPC .......... B60G 2300/084; B60G 2204/19; A01D 34/64; B60K 17/105
See application file for complete search history.

(56) References Cited

U.S. PATENT DOCUMENTS 3,796,275 A * 3/1974 Bouyer ................... B62D 61/08
                                                     180/6.4
4,577,712 A * 3/1986 Foote ........................ B62K 5/01
                                                     180/53.1
(Continued)

FOREIGN PATENT DOCUMENTS

DE        3804423 C2 *  1/1996  ............. B60K 17/10
JP    2004255918 A  *  9/2004  ........... B60K 17/105

*Primary Examiner* — Ruth Ilan
(74) *Attorney, Agent, or Firm* — Greenberg Traurig, LLP

(57) ABSTRACT

Front and rear independent suspension mechanisms accommodating an increased range of motion to better absorb shock originating at the wheels of a riding mower to insulate the operator and reduce stress on the mower chassis and other mechanical components. The front suspension can include a front axle with pivot pockets allowing 360 degree rotation of pivots engaged within the pockets, thereby providing a greater range of absorption of shock entering the front axle at varying angles. The rear suspension can include a vertically pivoting transmission platform, providing for controlled vertical motion in the transmission while the transmission is powered by an engine by way of a belt assembly.

6 Claims, 20 Drawing Sheets

Related U.S. Application Data continuation-in-part of application No. 13/840,070, filed on Mar. 15, 2013, now Pat. No. 9,161,490.

(60) Provisional application No. 61/677,288, filed on Jul. 30, 2012, provisional application No. 61/643,809, filed on May 7, 2012.

(51) Int. Cl.
*A01D 67/00* (2006.01)
*A01D 34/64* (2006.01)
*B60G 9/00* (2006.01)
*B60K 17/00* (2006.01)

(52) U.S. Cl.
CPC ............... B60G 9/00 (2013.01); B60K 17/00 (2013.01); *B60G 2300/084* (2013.01)

(56) References Cited

U.S. PATENT DOCUMENTS

| | | | | |
|---|---|---|---|---|
| 4,809,796 A * | 3/1989 | Yamaoka | ............ | B60K 17/105 180/308 |
| 5,067,933 A * | 11/1991 | Hardesty | ............ | B60K 17/105 475/32 |
| 5,799,475 A * | 9/1998 | Borling | ............ | A01D 34/64 280/788 |
| 5,946,893 A * | 9/1999 | Gordon | ............ | B60G 3/01 56/15.7 |
| 6,098,740 A * | 8/2000 | Abend | ............ | A01D 34/6806 180/305 |
| 6,510,678 B2 * | 1/2003 | Ferris | ............ | A01D 34/64 56/15.8 |
| 6,874,593 B2 * | 4/2005 | Abend | ............ | B60K 17/105 180/305 |
| 6,902,017 B2 * | 6/2005 | Ohashi | ............ | A01D 69/03 180/233 |
| 7,600,769 B2 * | 10/2009 | Bessho | ............ | B60G 9/022 280/124.109 |
| 7,708,106 B1 * | 5/2010 | Bergman | ............ | B60G 7/02 180/349 |
| 8,322,736 B2 * | 12/2012 | Bowers | ............ | B60G 9/02 180/348 |
| 8,398,101 B2 * | 3/2013 | Alexander | ............ | B60G 13/005 280/124.116 |
| 8,517,140 B2 * | 8/2013 | West | ............ | B60G 3/20 180/360 |
| 9,161,490 B2 * | 10/2015 | Melone | ............ | B60G 9/00 |
| 10,005,437 B2 * | 6/2018 | Slegelis | ............ | B60T 7/102 |
| 2002/0043422 A1 * | 4/2002 | Suzuki | ............ | B62K 5/01 180/357 |
| 2002/0179341 A1 * | 12/2002 | Boyer | ............ | B60K 17/04 180/6.48 |
| 2012/0248726 A1 * | 10/2012 | Batdorf | ............ | B60G 3/20 280/124.117 |

* cited by examiner

SUSPENSION SYSTEM AND METHOD

RELATED APPLICATIONS

This application is a continuation application and claims the benefit, and priority benefit, of U.S. patent application Ser. No. 13/889,024, filed May 7, 2013, which is a continuation-in-part of U.S. patent application Ser. No. 13/840,070 filed on Mar. 15, 2013, which claims priority under 35 U.S.C. § 119 to U.S. Provisional Patent Application No. 61/677,288 filed on Jul. 30, 2012, and U.S. Provisional Patent Application No. 61/643,809 filed on May 7, 2012, the entire contents of which are incorporated herein by reference.

BACKGROUND

The present invention is described with respect to its use on lawn mowers that can include rotating blades for cutting grass and other vegetation. For example, some conventional mowers can be configured as self-propelled mowers. A common problem associated with some conventional mowers is that they can produce uneven cuts and deliver unwanted stresses from the terrain to both the driver and mower structure, resulting in driver fatigue and discomfort, mower wear and tear, more frequent repairs, and a shorter mower life. Effective suspension concepts that have provided benefit to other types of motorized vehicles have not equally benefited riding mowers due to offsetting suspension needs.

SUMMARY

In one embodiment, the disclosed rear suspension assembly includes a first support having a first support first end, wherein a first bushing is affixed to the first support first end. The assembly also includes a second support having a second support first end, wherein a second bushing is affixed to the second support first end. Further, in some embodiments, the rear suspension assembly can include a third support having a third support first end affixed to a first support second end and a third support second end affixed to a second support second end. A pivoting mechanism mounts the first support and the second support to a horizontal chassis support.

In one embodiment, the pivoting mechanism includes a first mounting bracket having a first through hole and a second mounting bracket having a second through hole, wherein the first mounting bracket is affixed near a first end of the horizontal chassis support and the second mounting bracket is affixed in parallel to the first mounting bracket and near a second end of the horizontal chassis support. A steel pin dowel is passed through the first bushing and the first through hole and through the second bushing and the second through hole such that the first support and the second support are pivotally connected to the horizontal chassis support.

In another embodiment, the pivoting mechanism includes a first mounting bracket having a first socket and a second mounting bracket having a second socket, wherein the first mounting bracket is affixed near a first end of the horizontal chassis support and the second mounting bracket is affixed in parallel to the first mounting bracket and near a second end of the horizontal chassis support. A first ball is fitted within the first socket and a second ball is fitted within the second socket, such that the first support and the second support are each pivotally connected to the horizontal chassis support.

In yet another embodiment, the disclosed rear suspension assembly includes a single pivot suspension assembly that includes a first support having a first support first end, wherein a first support includes a first inward bend within the upper half of the length of the first support. The single pivot suspension assembly further includes a second support having a second support first end, wherein a second support includes a second inward bend within the upper half of the second support. A pivot mechanism is affixed to the first support first end and the second support first end, wherein the first support first end and the second support first end meet due to the first inward bend and the second inward bend. Also, a pivot mechanism connector is affixed to a horizontal chassis support, wherein the pivot mechanism is pivotally attached to the pivot mechanism connector. In some further embodiments, the single pivot suspension assembly can include a third support having a third support first end affixed to a first support second end and a third support second end affixed to a second support second end.

Other features and advantages of the present invention will become apparent to those skilled in the art upon review of the following detailed description, claims, and drawings.

DETAILED DESCRIPTION

Figure 1:
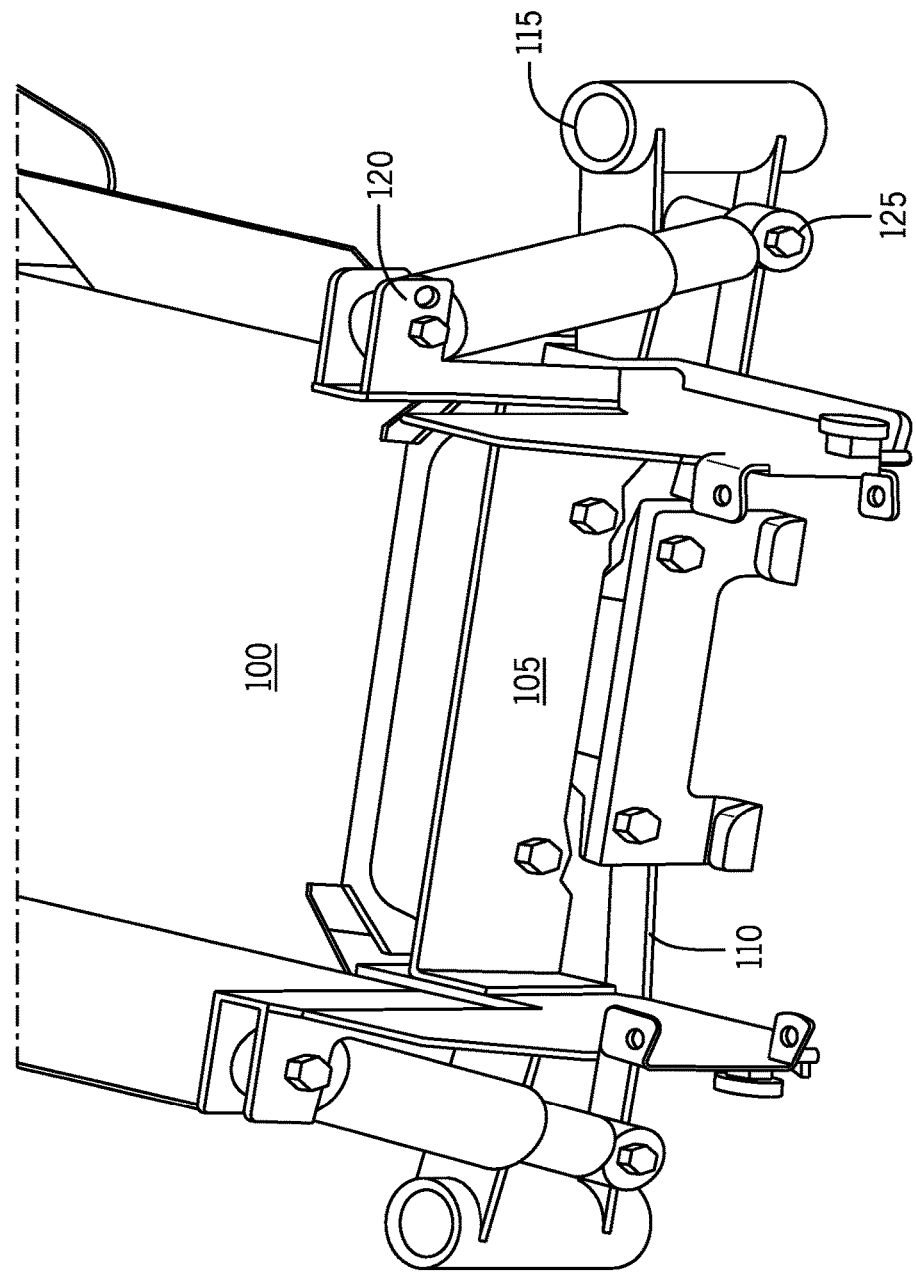
FIG. 1 is a rendering of a front suspension of a mower including a front axle relative to the front-end suspension mechanism according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures may have similar or different reference numerals. The figures, which are not to scale, depict selected embodiments and are not intended to limit the scope of embodiments of the invention. Those of ordinary skill in the art will recognize the examples provided herein have many useful alternatives that fall within the scope of embodiments of the invention.

Some embodiments of the invention can include a front independent suspension assembly that can be capable of being connected to a mower. In some embodiments, the front independent suspension assembly can include a front axle and a first bushing through-hole that can be positioned right of center on a front-facing portion of the front axle. The first bushing through-hole can include a first rotatable bushing seated therein. In some embodiments, the first rotatable bushing can include a first slot to sufficiently seat a first inner bushing, so that the first inner bushing can move from a first slot first end to a first slot second end. In some embodiments, a second bushing through-hole can be positioned left of center on the front-facing portion of the front axle. The second bushing through-hole can include a second rotatable bushing seated therein. In some embodiments, the second rotatable bushing can include a second slot to sufficiently seat a second inner bushing, so that the second inner bushing can freely move from a second slot first end to a second slot second end.

Some embodiments of the invention can include a rear independent suspension assembly that is capable of being connected to a mower. In some embodiments, the rear independent suspension assembly can comprise a first support including a first support first end that can include a first bushing coupled to the first support first end. In some embodiments, a second support can include a second support first end that can include a second bushing coupled to the second support first end. In some embodiments, the rear independent suspension can include a third support including a third support first end coupled to a first support second end and a third support second end that can be coupled to a second support second end. In some embodiments, the rear independent suspension assembly can include a pivoting mechanism mounting.

Some embodiments presented herein can address one or more of the problems and limitations of the prior art by incorporating unique front and rear suspension assemblies capable of buffering at least a portion of the shock that is administered to the wheels, before the energy reaches the primary chassis. The disclosed suspension systems also provide greater horizontal stability for the mower. In one embodiment, a unique suspension assembly is affixed to both the front and rear of the mower chassis. In one embodiment, a front suspension assembly (i.e., front axle) may be connected to the front of the chassis or near the longitudinal center of the chassis, while the rear suspension assembly can be connected to the sides of the chassis a distance from the rear of the chassis. Either or both suspension assemblies may be mounted to the chassis via pivots and/or joints secured to the chassis. Either or both suspension assemblies can be connected directly to wheels, shock absorbers, and springs.

The combined front and rear suspension assemblies described herein provides for multi-dimensional wheel movement while maintaining chassis stability, which exceeds that which is currently available using conventional suspension methods. For example, movement caused by an uneven surface may be partially isolated to the uniquely disclosed rear suspension assembly through independent vertical movement of the rear tires and transmission assembly. With the improved freedom of movement of the front axle, wheel contact with uneven ground, such as a steep upward or downward grade, is improved due to the front wheels being able to move generally vertically without greatly altering the relationship of the chassis with respect to the surface traversed, or at least with reduced movement of the chassis. In this manner, roll and pitch of the chassis can be significantly reduced, resulting in a higher-quality cut and improved comfort for the operator.

In these and other embodiments, the front and rear suspension assemblies are independent, and can be connected to a beam, sub-frame, or other structure that is pivotally coupled to the mower chassis, thereby transmitting upward, downward, and sideways force to the independent suspensions, as well as to the pivoting beam, sub-frame, or other structure. Regardless of whether the cutter deck is also connected to these independent suspensions, this arrangement can result in improved suspension and cutter deck movement.

FIG. 1 is a rendering of a front suspension of a mower including the front axle relative to the front-end suspension mechanism according to one embodiment of the invention. The front-end suspension mechanism, or assembly, can include an axle 105 that can be moveably coupled (e.g., pivotally coupled) to the chassis 100 by way of pivots, which will be discussed in greater detail with reference to FIG. 2.

In some embodiments, the axle 105 can include a reinforced bolt hole 125 to support a bottom portion of a shock absorber and/or spring. The shock absorber and/or spring can be secured and compressed between the axle 105 and the chassis 100 by way of a bracket 120 that can be attached to the chassis 100. The bracket can include a bolt hole 120 for securing the top portion of the shock absorber and/or spring.

In some embodiments, the axle 105 can be configured to include end mounted bushings 115, so that a wheel and steering assembly can be pivotally integrated within the bushings 115. Although the axle 105, as described herein, includes improvements that will be described below, practitioners will appreciate that various steering mechanisms and mechanical configurations of can be used with embodiments of the invention.

In some embodiments, the front suspension assembly and chassis 100 can include any number of additional fixtures and brackets for attaching, for example, a bumper or any other component. Although not enumerated, the drawings may illustrate such fixtures without specific description. Practitioners will appreciate that the figures may include such elements even though they may not be pertinent to the improved suspension assemblies disclosed herein. More specifically, these elements may be included in the drawings for the purpose of explanation only and to show the placement of critical components relative to possible placements for plates, rods, bars, tabs, wings, extensions, bosses, platforms, struts, and other framework elements.

Figure 2:
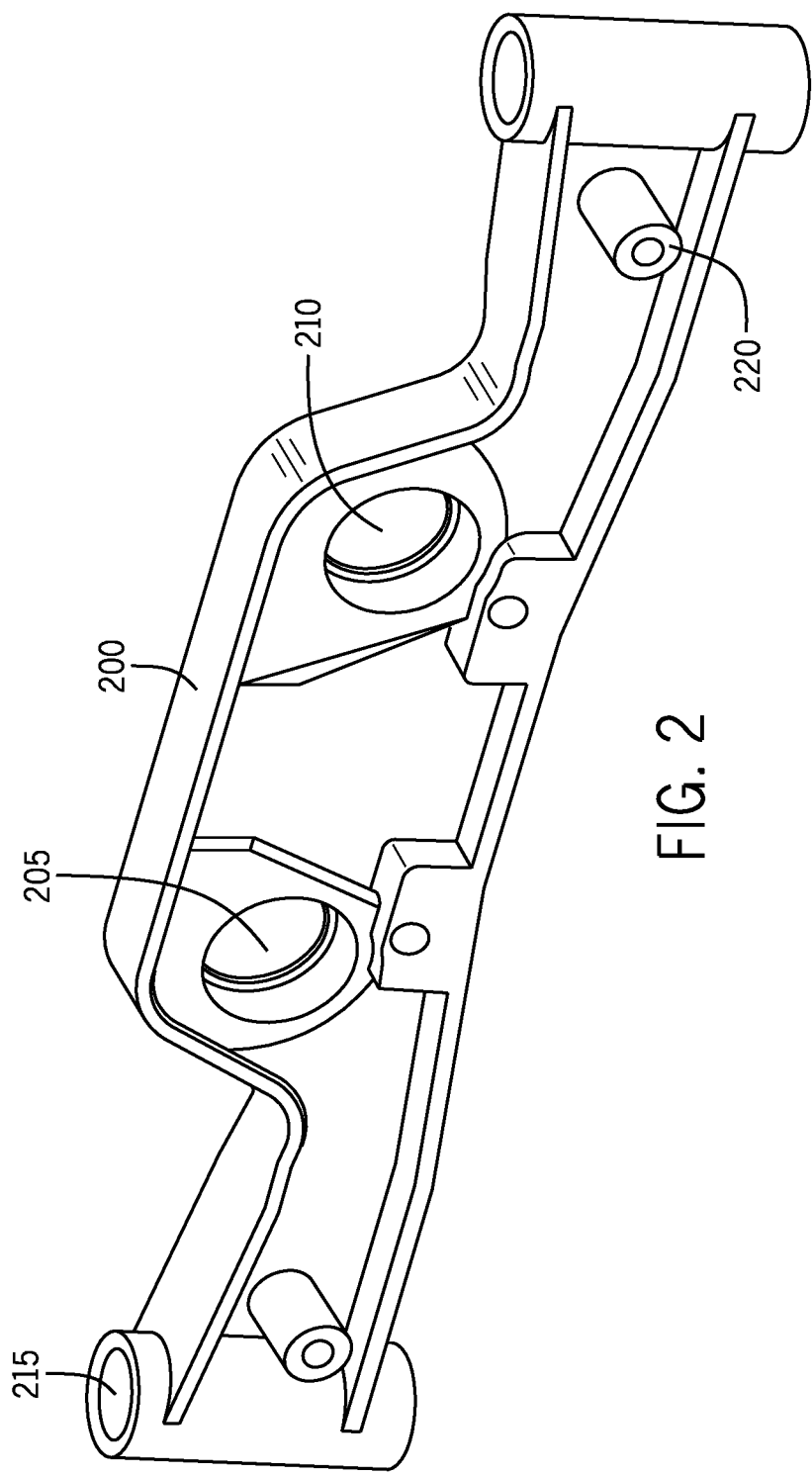
FIG. 2 is a rendering of a front suspension of a mower including a front axle with pivot pockets according to one embodiment of the invention.

FIG. 2 is a rendering of a front suspension of a mower including the front axle 200 with pivot pockets 205 according to some embodiments of the invention. As previously mentioned, the axle 200 can be configured and arranged to be coupled to and/or support a steering assembly and front wheels. In one embodiment, the axle 200 can include a bushing 215 to allow a steering assembly to move (e.g., pivot from side to side) under the steering influence of the mower operator. Also, in some embodiments, the axle 200 can comprise any number of threaded and/or unthreaded reinforced bolt holes 220 for supporting additional mower chassis elements including, for example, a front bumper.

In some embodiments, the axle 200 can include one or more pivot pockets 210 to accommodate and secure a rotating bushing. In some embodiments, the axle can comprise a left-of-center pivot pocket 205 and a right-of-center pivot pocket 210 that can be positioned in order to distribute the load and stress resulting from the mass of the mower components, motion, and mechanical vibration. In one embodiment, the pivot pockets 205, 210 can be formed (e.g., bored) and polished so that a bushing assembly can be inserted and maintained so that few or no gaps exist between an outer surface of the bushing and a pivot pocket inner surface area.

In some embodiments, the pivot pockets 205, 210 can be coated with and/or fitted with a synthetic material lining such as, for example, polypropylene. For example, such a material lining the pivot pockets 205, 210 can reduce or eliminate the need for lubrication and/or may function to absorb heat and vibration.

Figure 3:
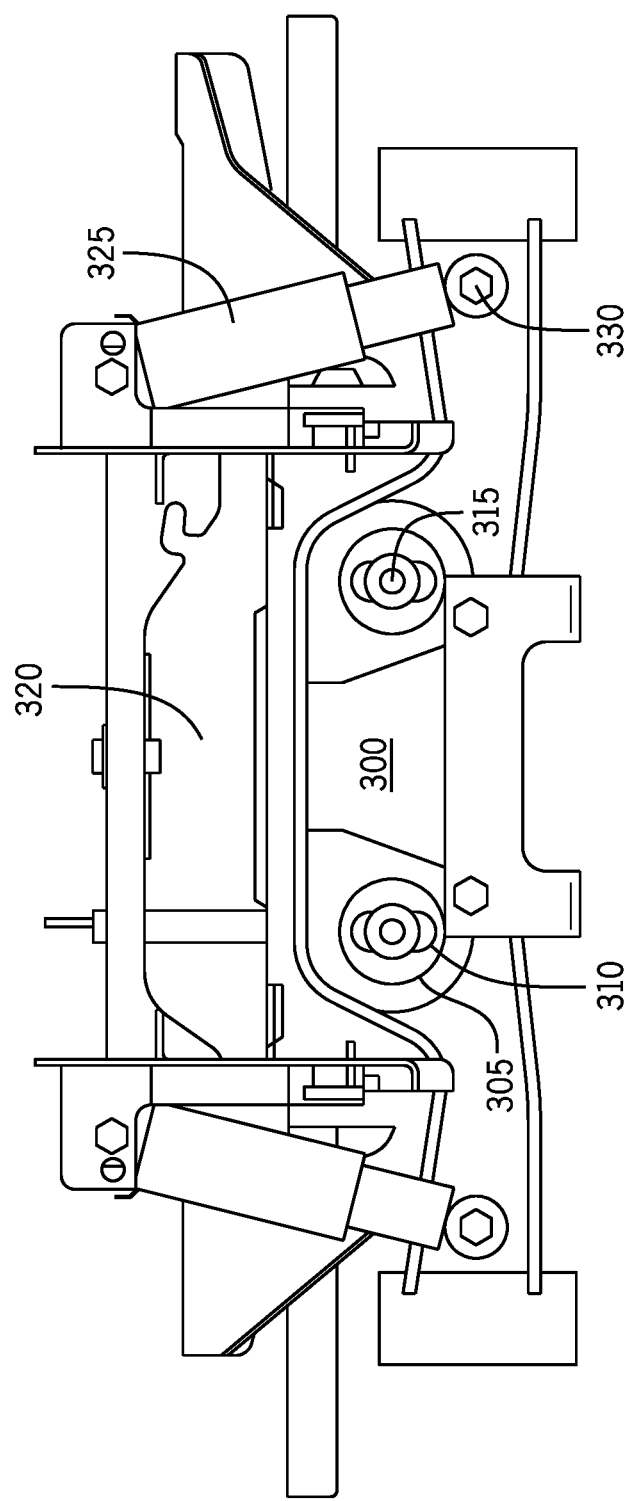
FIG. 3 is a rendering of a front suspension of a mower showing the rotation of a pivot bushing within the pivot pockets according to one embodiment of the invention.

FIG. 3 is a rendering of a front suspension of a mower showing the rotation of a pivot bushing within the pivot pockets according to one embodiment of the invention. FIG. 3 provides a frontal view of the axle 300 relative to some suspension and chassis components. The axle 300 can be configured to allow multiple levels of vertical movement of the axle 300 while maintaining the weight of the mower chassis, mechanical components, and operator. As described above, additional movement in the axle 300 can provides increased shock absorption properties, thereby reducing structural stress and providing a more comfortable ride for the operator.

Overall weight can be a factor in the manufacture of mechanical equipment, but can be particularly relevant for machines that are mobile. As such, the selection of construction materials is often a balance between keeping the components as light as possible, while enabling the components to withstand the rigors to which they will normally be exposed. In some embodiments, the mower chassis 320 can comprise a thin gauge steel with machined features (e.g., bends and creases), which can significantly increases the strength of the chassis 320, so that the chassis 320 is capable of supporting the shifting weight of the various components when the mower is in use.

In some embodiments, the axle 300 can be configured and arranged to allow for movement. For example, shock absorbers and/or springs 325 can be positioned on one or both sides of the axle 300 and can be connected thereto by a bolt 330 passing through a bolt hole in the end of the shock absorber 325 and extending into a reinforced bolt hole in the axle 300. The shock absorbers and/or springs 325 can function to reduce shock and vibration that can originate at the wheels and preventing the shock from traversing the mower chassis. Moreover, in some embodiments, the shock absorbers and/or springs 325 can stabilize the chassis 320, which can aid in maintaining a generally vertically upright posture even when the axle 300 is significantly tilted. The shock absorbers and/or springs 325 can cause the axle 300 to return to a level configuration when the surface beneath the wheels is primarily level.

As described in reference to FIG. 2, the axle 300 can include a pivot pocket 205, 210 that can be configured to maintain a rotating bushing 305. As illustrated in FIG. 3, the bushing 305 can be seated within the pivot pocket. In one embodiment, the pivot pocket 205, 210, the bushing 305, or both can be coated or lined with a material that can significantly reduce or eliminate the need for lubricants. For example, due to the high pressures asserted against the walls of the bushing 305, a material that can provide sufficient viscosity would be required to withstand significant frictional heat and pressure over a long period of time. Such materials can comprise alloys, ceramics, silicones, and plastics.

In some embodiments, the bushing 305 can include bearings, so that the rotating portion of the bushing 305 can move on small balls or cylinders, which can thereby reduce frictional stress to the bushing 305. The bushing 305 can be maintained in a proper position relative to the pivot pocket in any conventional manner. In one embodiment, the bushing 305 can include an outer sleeve (not shown), for example, that can extend beyond the depth of the pivot pocket 205, 210. The portions of the sleeve extending beyond the front and back surfaces of the axle 300 can be folded outward, which can secure the bushing 305 within the pivot pocket.

In some embodiments, the bushing 305 can include a slot 310, which can extend at least a portion of a thickness of the bushing 305. In some embodiments, the slot 310 can comprise an oval or elliptical configuration. In other embodiments, the slot 310 can comprise other suitable configurations. In one embodiment, the slot 310 can be centered with respect to the bushing 305 and can be formed (e.g., machined) to comprise a tight tolerance and can include a polished internal surface. At its widest point, the slot 310 can be sized to accommodate a support post 315 that can extend through the bushing 305. The post 315 can comprise any suitable material that can be sufficiently durable and will not significantly flex or break under the weight and pressure of the mower and its operator. In one embodiment, the support posts 315 can maintain the entire weight of at least the front portion of the mower.

Figure 4:
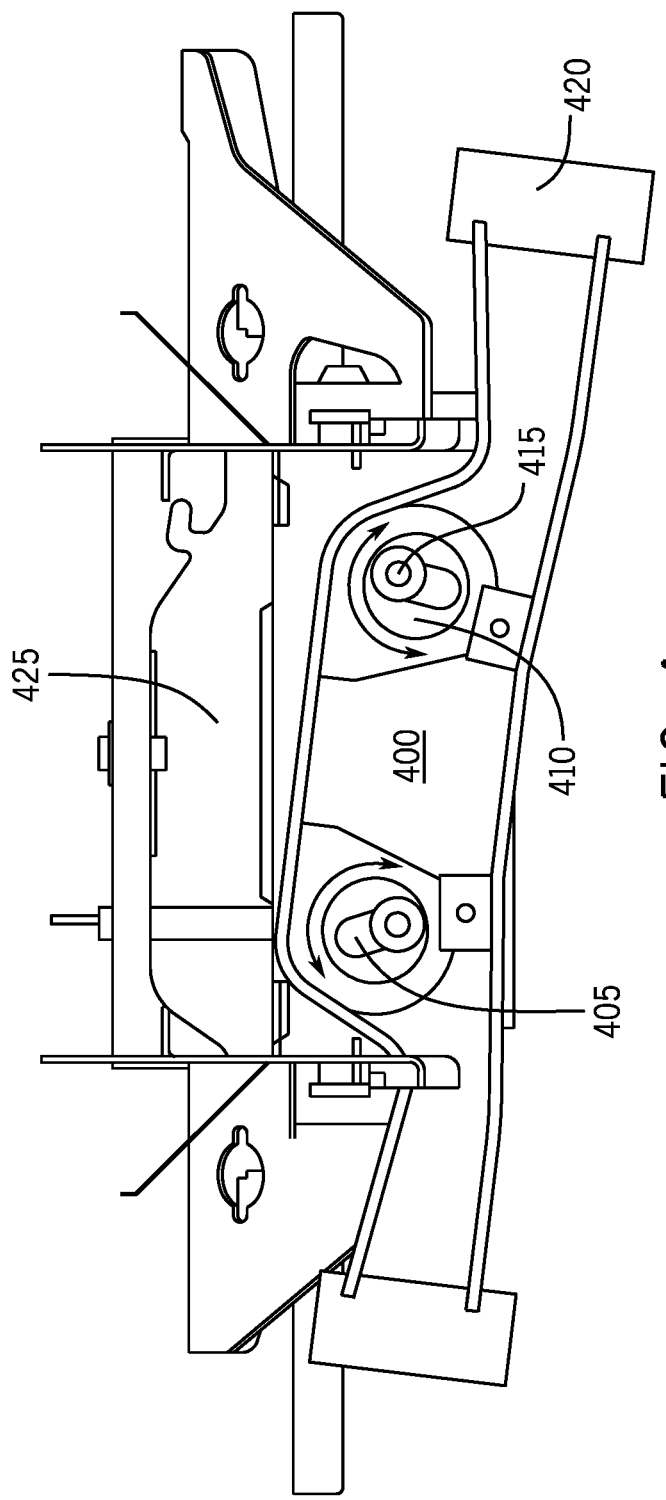
FIG. 4 is a rendering showing a closer view of the pivot pockets in the axle according to one embodiment of the invention.

FIG. 4 is a rendering showing a closer view of the pivot pockets in the axle according to one embodiment of the invention. In FIG. 4, the axle 400 is illustrated so that the mower appears to be positioned on an incline, with the left end (front view) of the axle 400 being significantly higher than the right side of the axle. By way of example only, the front-right wheel supported by the axle 400 may be positioned within a trench, leaving a mower chassis 425 in a proper upright position with compensation for the uneven ground surface being provided by the axle 400.

With the axle 400 in the uneven position as illustrated, the relationship between the axle's pivot pocket, bushing 410, bushing slot 405, and support posts 415 is more apparent. In some embodiments, the slotted bushing 410 can allow the bushings 410 to rotate substantially or completely independently, which can provide a greater degree of movement for the axle 400 because the support posts 415 can maintain a constant position. Moreover, the slotted bushing can provide these benefits without degrading the integrity of the support system. Without the rotating and slotted bushings 405, the illustrated strait up-and-down movement would be difficult to achieve while maintaining the weight of the mower on the posts 415. For example, in order to achieve the same or a similar pattern of movement without using the slotted bushings 405, the axle 400 could pivot on a single post extending through the axle 400 through a single centered pivot pocket, which would render the mower extremely unstable and prone to tipping to one side or the other. Some embodiments allow two posts 415 to be used to support both the left and right sides of the mower, while still allowing the a degree of vertical movement to the axle 400.

Figure 5:
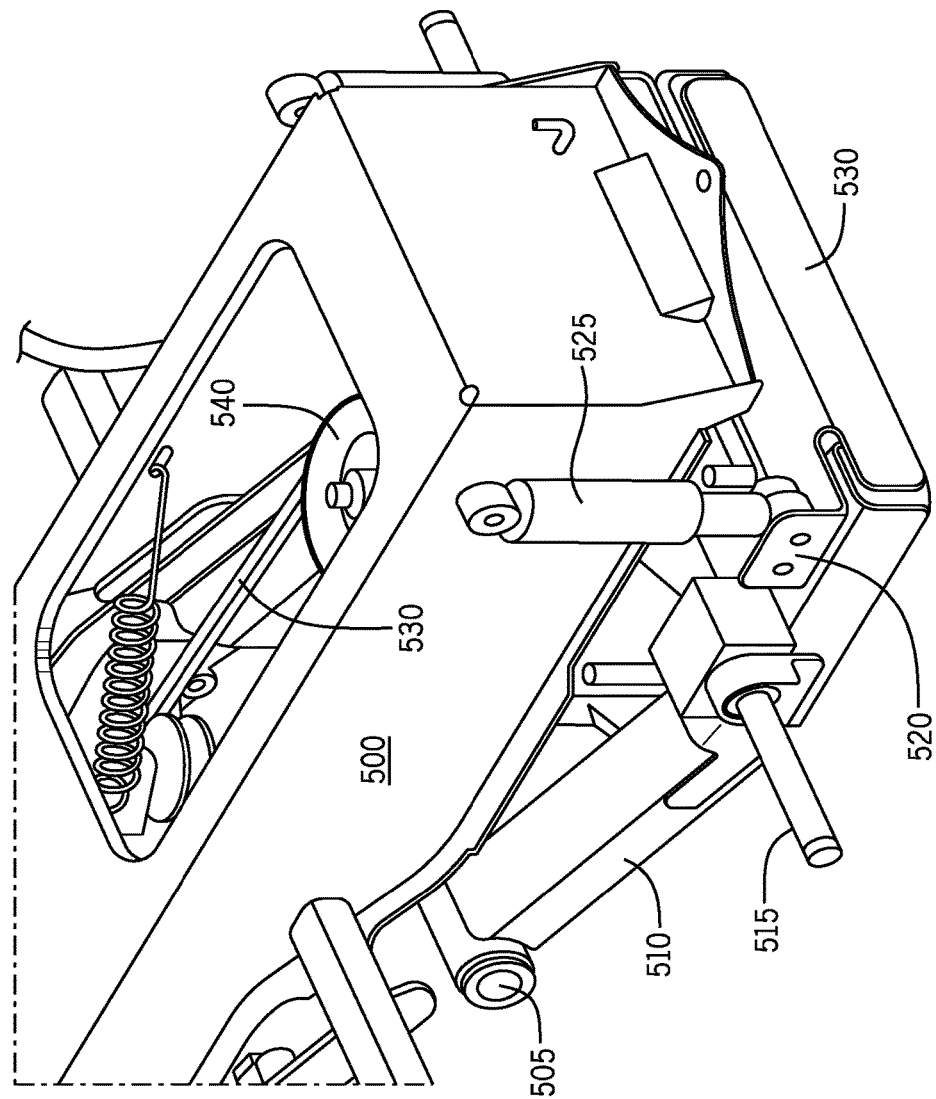
FIG. 5 is a rendering showing a top angle view of a rear suspension mechanism according to one embodiment of the invention.

FIG. 5 is a rendering showing a top angle view of a rear suspension mechanism according to one embodiment of the invention. The provisioning of sufficient rear suspension in a conventional riding mower can be a difficult task because of the spatial conditions that include the engine and the transmission that are positioned in fairly close proximity. Although an independent suspension of the back tires of a mower could have been possible, a pivoting rear-wheel assembly providing vertical movement to the entire rear axle has not been practical or efficient in conventional lawn equipment. The inability to pivot the entire rear axle arises from the need to position the transmission in a substantially or completely stationary position above the axle.

In one embodiment, the rear suspension assembly includes a number of supports that are pivotally connected to the mower chassis. As specifically shown in FIG. 5, the left support 510 is visible, which is pivotally attached to the chassis 500 by way of a bushing and dowel pin 505. Also visible in this figure is the rear support 530 that may include brackets 520 for attaching shock absorbers 525 and/or springs to provide vertical movement control to the rear suspension assembly.

The support members 510, 530 are sufficiently sturdy to provide adequate support for the weight and movement of powertrain (minus the engine). This includes a transmission assembly that drives the rear axle 515, which ultimately provides bidirectional movement to the mower. Power for that movement is transferred from the engine to a transmission input pulley 525 by way of a drive belt 530.

Figure 6:
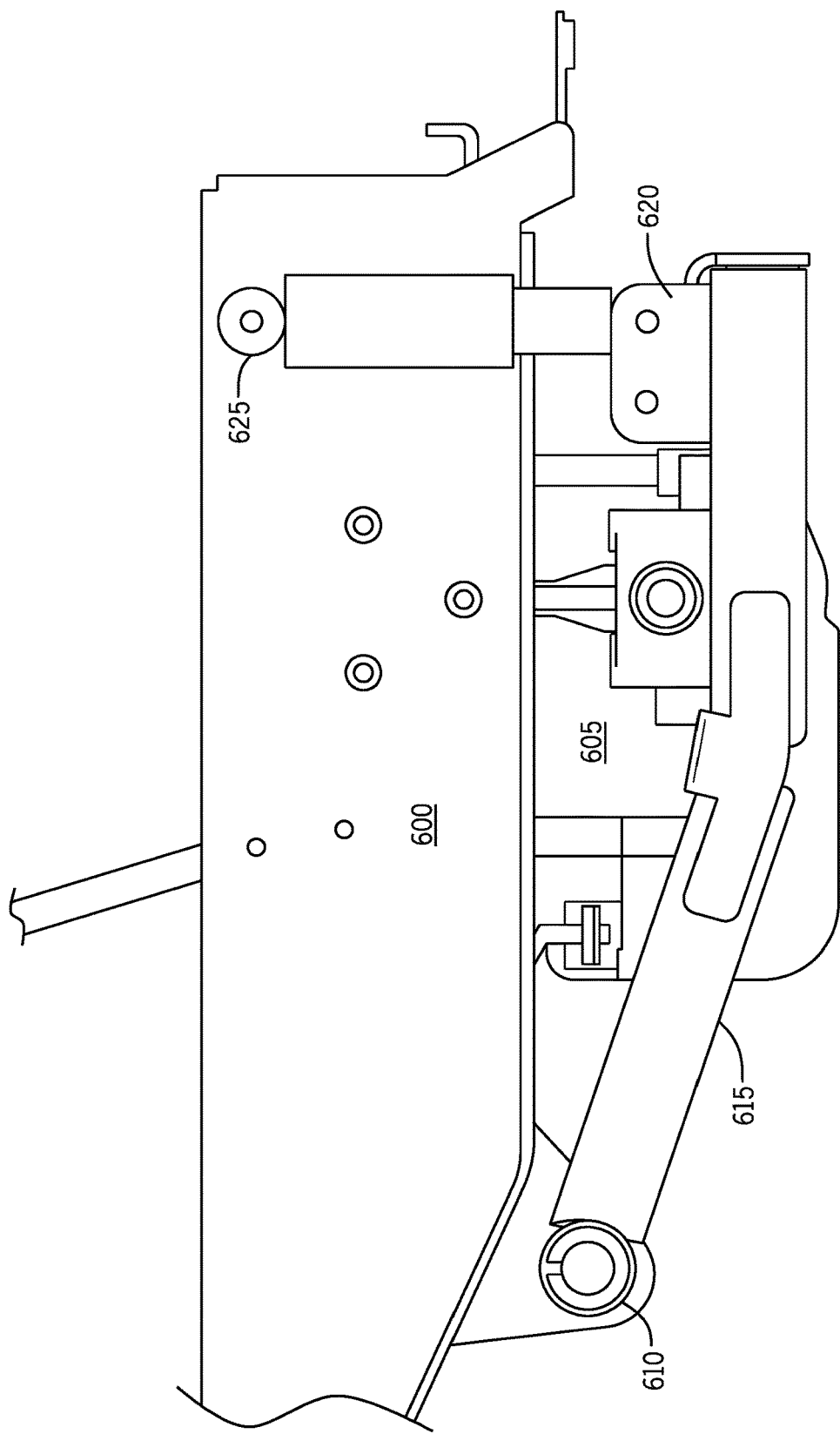
FIG. 6 is a rendering showing a side view of a rear suspension mechanism according to one embodiment of the invention.

FIG. 6 is a rendering showing a side view of the rear suspension mechanism according to one embodiment of the invention. As described in reference to FIG. 5 above, the side perspective illustrates how a transmission assembly 605 can be securely mounted to a rear suspension assembly 615, which can be positioned via one or more hinges 610 between the transmission assembly 605 and the engine. In some embodiments, shock absorbers and/or springs 625 can enable controlled movement of the rear suspension assembly 615 and can return the assembly 615 to a normal position when the mower is operated or parked on a level surface.

Another advantage to the rear suspension assembly as illustrated in FIG. 6 is that the transmission assembly 605, which represents a significant proportion of a mower's overall weight, is included in the moveable assembly. As such, the transmission is largely unable to amplify mower movement and vibration, as would a rigidly connected transmission.

Some conventional mowers that include a separate engine and transmission transfer power from the engine to the transmission by way of a drive belt that wraps around engine and transmission pulleys. Due to the distance between the engine and the transmission 605 according to the present embodiment; the vertical movement of the transmission 605 creates very subtle variances in the angle of the drive belt. For example, a longer belt path creates a more subtle change in the belt's angle. As such, some embodiments of the invention can experience less belt and pulley stress over time relative to belt and pulley stress in some conventional mowers (e.g., mowers including a belt that traverses pulleys that are significantly out of alignment with each other). Moreover, a belt that rotates between pulleys that are significantly out of alignment can be more prone to slip off of one or both of the pulleys.

Figure 7:
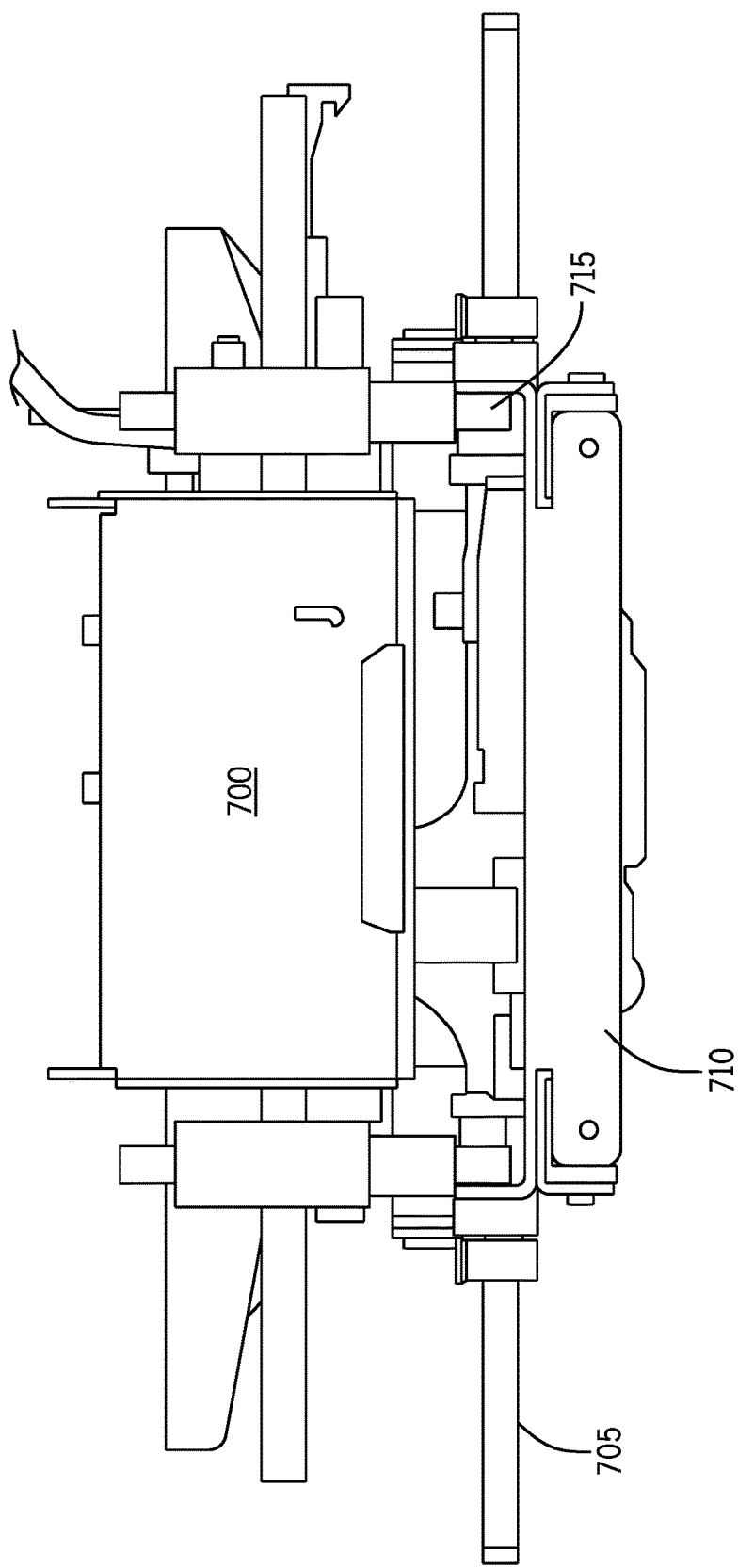
FIG. 7 is a rendering showing a rear view of a rear suspension mechanism according to one embodiment of the invention.

FIG. 7 is a rendering showing a rear view of the rear suspension mechanism according to one embodiment of the invention. In some embodiments, the transmission can be shielded by a cover 700 that can provide hinged access to the transmission while protecting the user from heat and moving components including, for example, the drive pulley, drive belt, and cooling fan.

In various embodiments, the rear suspension assembly can include one or more guards or shields that can be configured to protect the operator or shield sensitive electrical and mechanical components from exposure to dirt, heat, or tampering. For example, the rear suspension assembly may include a lower shield 710 that can protect the lower components of the transmission.

In some embodiments, the transmission assembly can be positioned on the rear suspension assembly, which can be subject to vertical movement that can generally originate at the tires and can be transferred to the axle 705. The axle 705 can be attached to the rear suspension assembly at a position where springs and/or shock absorbers 715 may absorb some or all of the vertical movement, without having the full movement transferred to the mower chassis.

Figure 8:
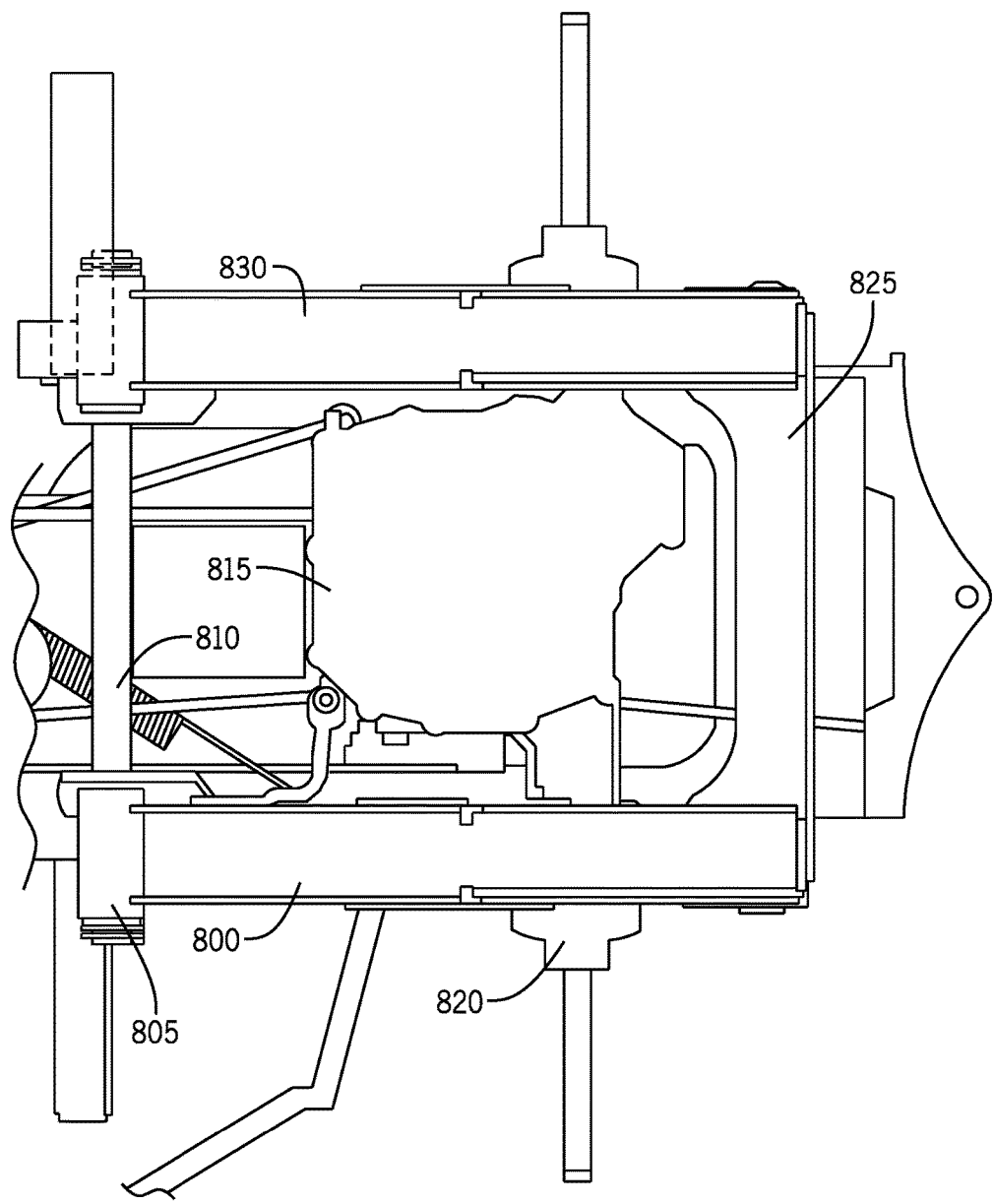
FIG. 8 is a rendering showing a bottom-up view of a rear suspension mechanism according to one embodiment of the invention.

FIG. 8 is a rendering showing a bottom view of the rear suspension mechanism according to one embodiment of the invention. The pivot points 805 for the rear suspension assembly can include a bushing 805 affixed to support bracket 800 and support bracket 830. The support brackets, including 800, 830 and 825 can be coupled to each other to maintain the weight of the transmission assembly 815 while being subject to vertical and horizontal shock. In some embodiments, the pivot point 805 can allow the support brackets 800, 830 to be pivotally attached to the mower chassis by a dowel pin 810, so that a certain amount of vertical motion in the rear suspension assembly can be permitted while protecting the attached components from damaging movement and vibration.

In some embodiments and some conventional systems, the transmission 815 is one of the components that can be subjected to shock because of the configuration requiring the transmission 815 to transfer power from the mower engine to the drive axle 820. The pivoting rear suspension, as disclosed herein, can at least partially protect the transmission 815 by enabling controlled motion of the transmission 815 relative to the rear suspension.

Figure 9:
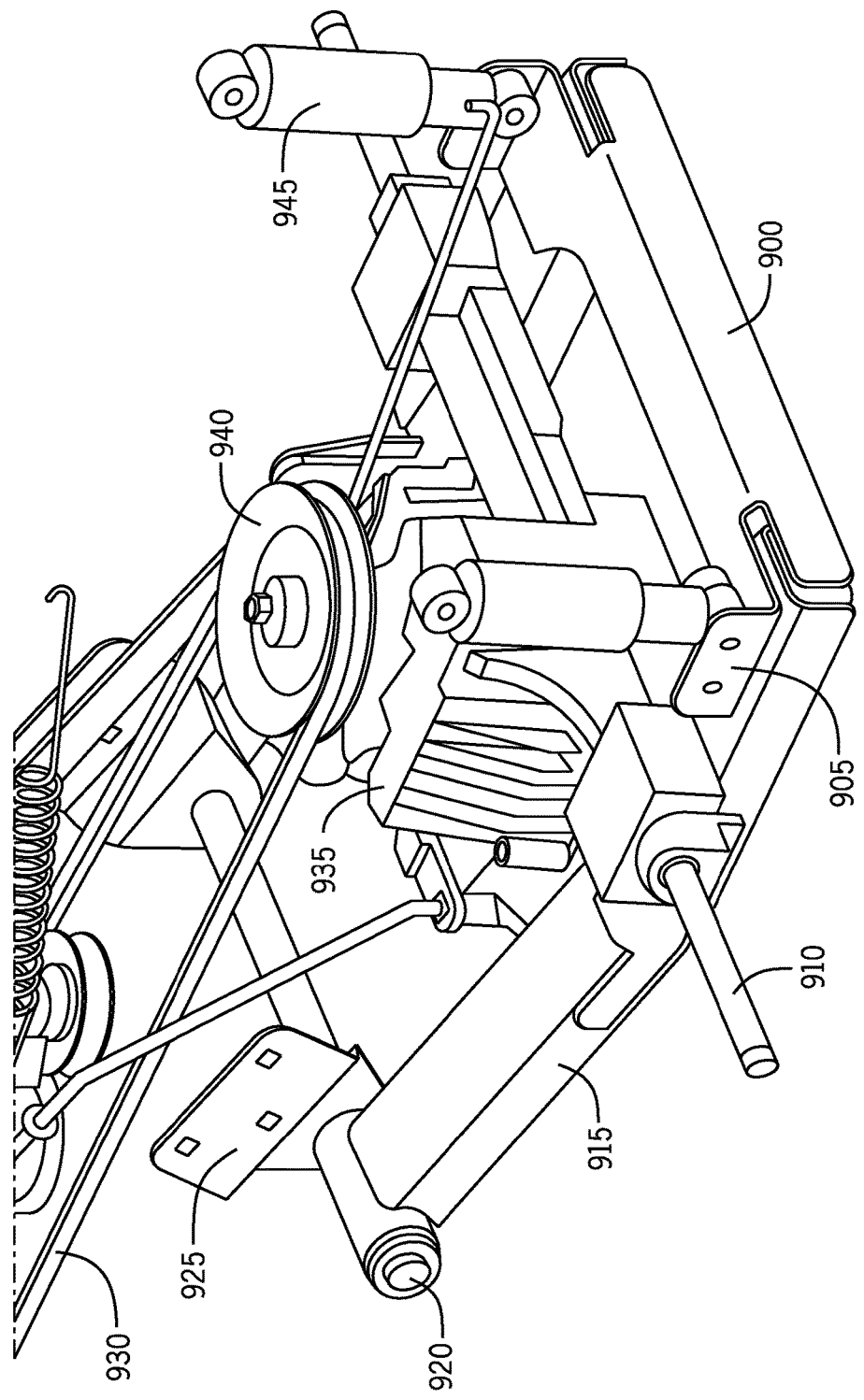
FIG. 9 is a rendering showing a top-down view of a rear suspension mechanism detached from a mower chassis according to one embodiment of the invention.

FIG. 9 is a rendering showing a top angle view of the rear suspension mechanism detached from the mower chassis according to one embodiment of the invention. In accordance with this view, the rear suspension assembly is illustrated as being disconnected from the chassis, thereby providing a clear view of the disclosed suspension assembly.

As described relative to the previous figures, the rear suspension assembly comprises two support brackets 915, which can be coupled together using at least a third support bracket 900. Practitioners will appreciate that this configuration is presented as one embodiment and that other configurations for support brackets and modification of the shape of the rear suspension assembly is possible to meet end user or manufacturer needs. For example, the rear suspension assembly can include a fourth support bracket (not shown) that can be positioned near the mounting plate 925 to further add to assembly stability. However, for the purpose of minimizing the overall weight of the suspension assembly, additional support brackets may be omitted as they may not be necessary to the integrity of the structure.

The mounting plate 925 enables coupling of the rear suspension assembly and a mower chassis by way of insertion of a dowel pin 920, which can allow the suspension assembly to pivot. The pivoting motion can be softened and limited by shock absorbers 945 or springs that are mounted to the rear suspension assembly by a mounting bracket 905 that can be welded and/or bolted to a rear support bracket 900.

In some embodiments, extending beyond the width of the side support brackets 915, the axle 910 can be configured to maintain and provide motion to the mower's rear wheels. To provide forward and backward motion to the axle 910, the transmission 935 can includes a series of gears and other hardware for converting rotary engine movement to directional movement (i.e., the transmission 935 can comprise a substantially conventional transmission configuration). That movement is transferred by way of a drive belt 930 that connects an engine pulley to the transmission input pulley 940.

Figure 10:
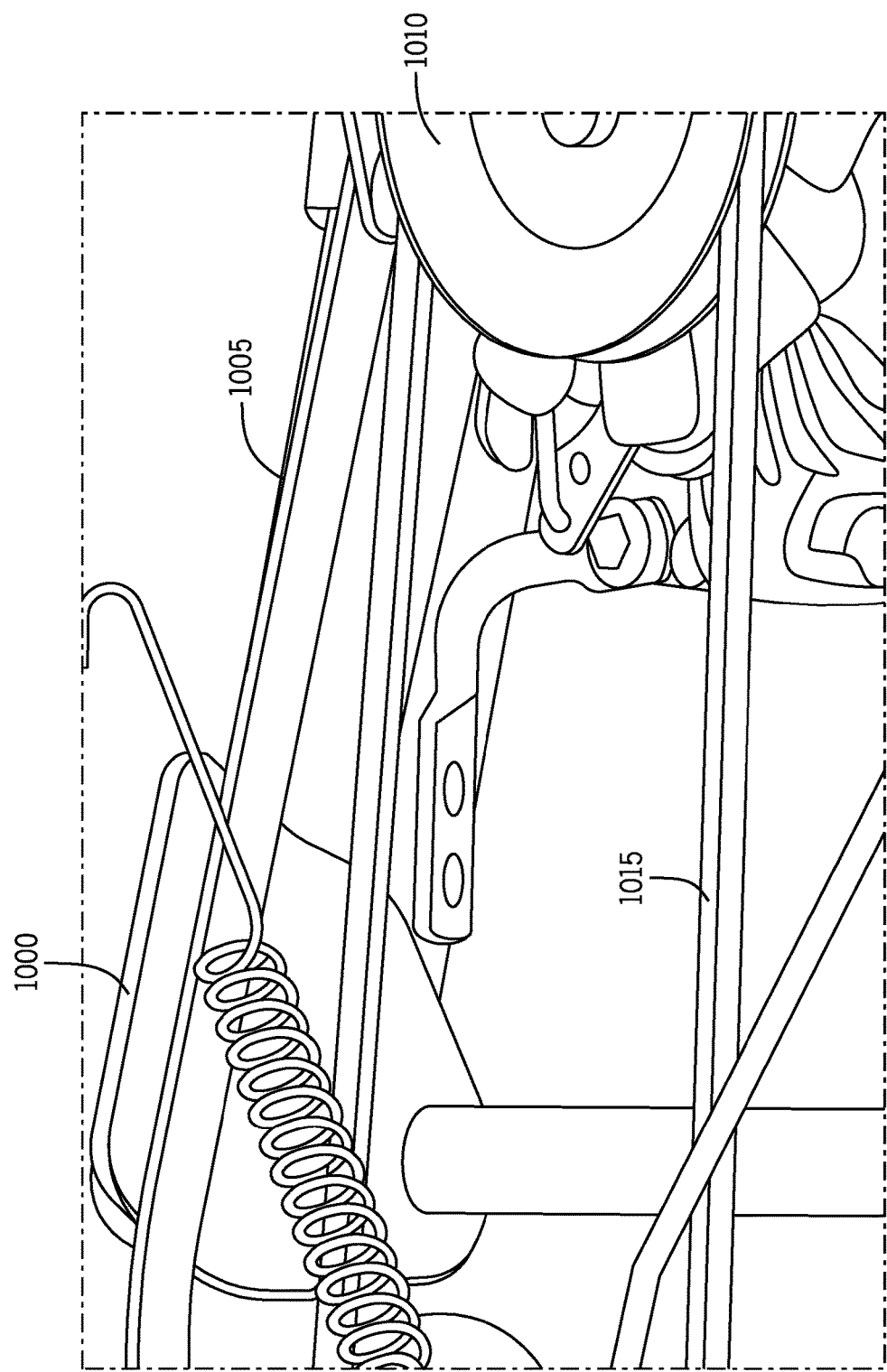
FIG. 10 is a rendering showing a detail view of a transmission input pulley and belt relative to a rear suspension mechanism according to one embodiment of the invention.

FIG. 10 is a rendering showing a detail view of the transmission input pulley and belt relative to the rear suspension mechanism according to one embodiment of the invention. In this close-up perspective, the mounting bracket 1000 can be seen for securing the dowel pin that can be inserted through bushings in the rear suspension assembly. A transmission control arm 1005 is shown for allowing the mower operator to control the general speed and direction of the mower. Power is transferred from the engine to the transmission, which is secured on the rear suspension assembly, by way of a drive belt 1015 that can wrap around the transmission input pulley 1010.

Figure 11:
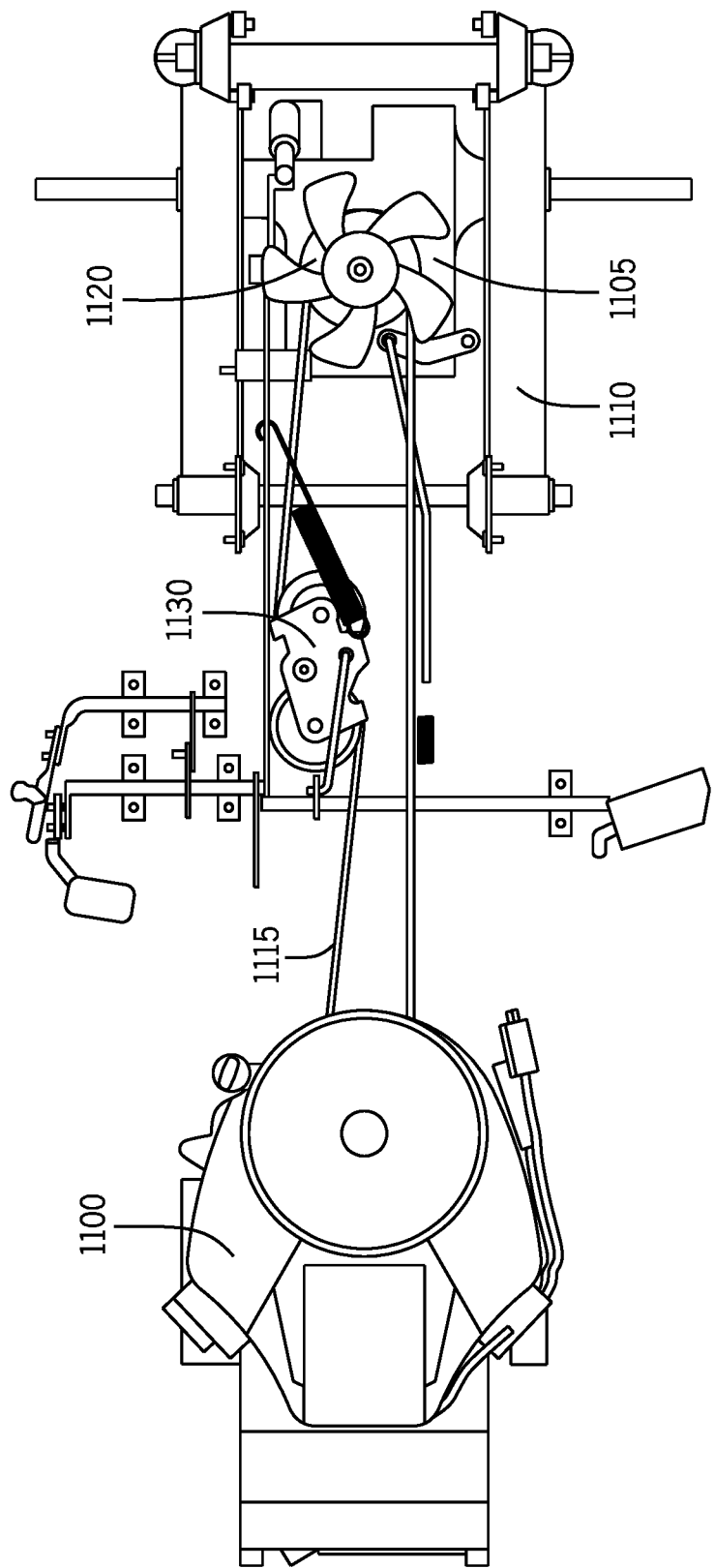
FIG. 11 is a rendering showing a top-down view of a mower engine relative to a rear suspension mechanism including a transmission assembly according to one embodiment of the invention.

FIG. 11 is a rendering showing a top-down view of the mower engine relative to the rear suspension mechanism including the transmission assembly according to one embodiment of the invention. In accordance with this view, the general distance between the engine 1100 and the transmission 1105 situated on the rear suspension assembly 1110 can be more clearly discerned.

As previously described, in some embodiments, the greater the distance or length of the drive belt 1115, the lesser overall impact a shift in the positioning of the transmission input pulley 1120 will have. As the rear suspension assembly 1110 moves vertically in response to the terrain, the elevation of the attached transmission 1105 can be changed by small amounts relative to some conventional mower systems. As such, the angle of the drive belt 1115 can often change but by relative small distances. Moreover, as the transmission 1105 moves, the tension of the drive belt 1115 can be varied. Therefore a tensioner assembly 1130 can be employed to ensure that the drive belt 1115 tension remains substantially or completely constant, thereby lessening any affect that the moving transmission 1120 may have during mower operations.

Figure 12:
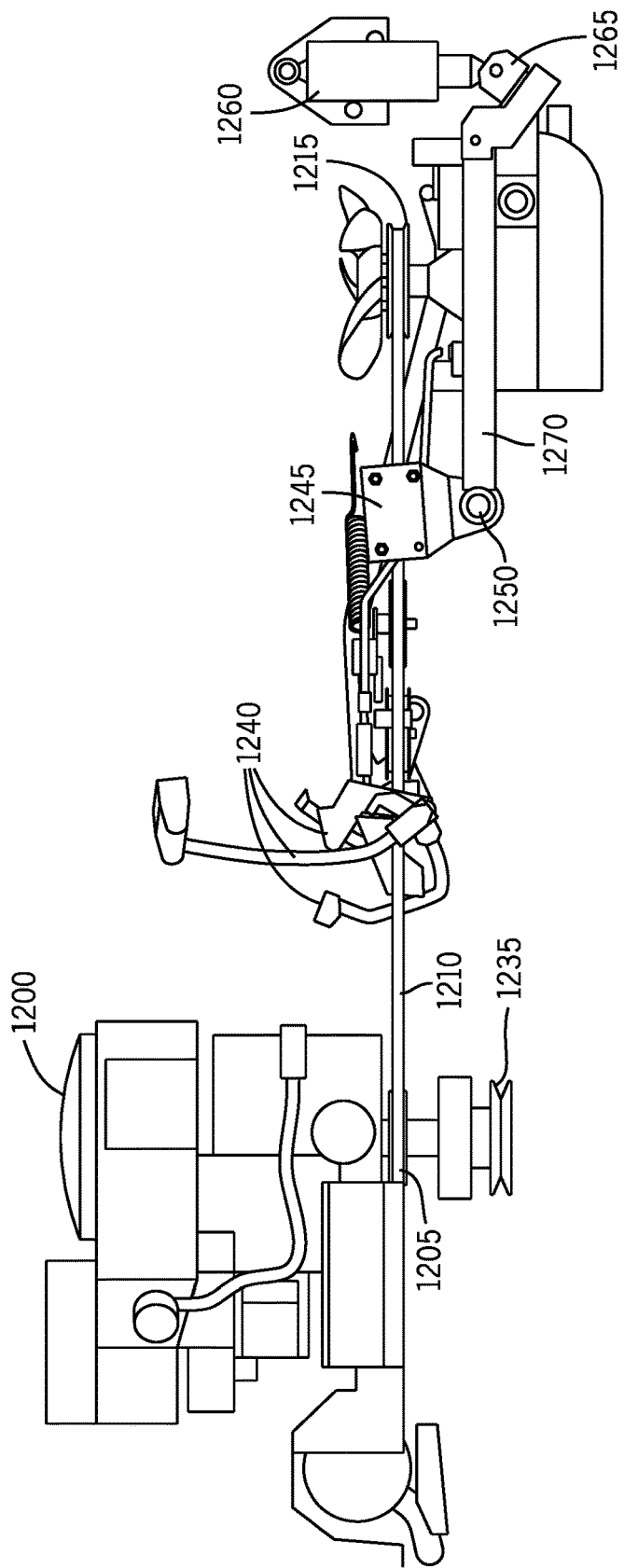
FIG. 12 is a rendering showing a side view of a mower engine relative to a rear suspension mechanism including a transmission assembly according to one embodiment of the invention.

FIG. 12 is a rendering showing a side view of the mower engine relative to the rear suspension mechanism including the transmission assembly according to one embodiment of the invention. This side perspective illustrates the engine pulley 1205 positioned so that the drive belt 1210 comprises a generally planar configuration, relative to the transmission input pulley 1215 of the transmission 1220.

In some embodiments, the engine 1200 can be positioned adjacent to a front of the mower and the engine shaft includes a pulley 1235 that can be configured to provide power to a cutting assembly (not shown). The mower can also include operator controls 1240 for controlling the mower's speed and direction and the rear suspension assembly mounting bracket 1245 can be mounted to the chassis of the mower. The dowel pin 1250 can couple the suspension assembly bushings 1245 and the mower chassis, while allowing the suspension assembly 1270 substantially or completely independent movement that may be governed and dampened by shock absorbers and/or springs 1260 attached to a suspension assembly support bracket 1265 and the mower chassis.

Figure 13:
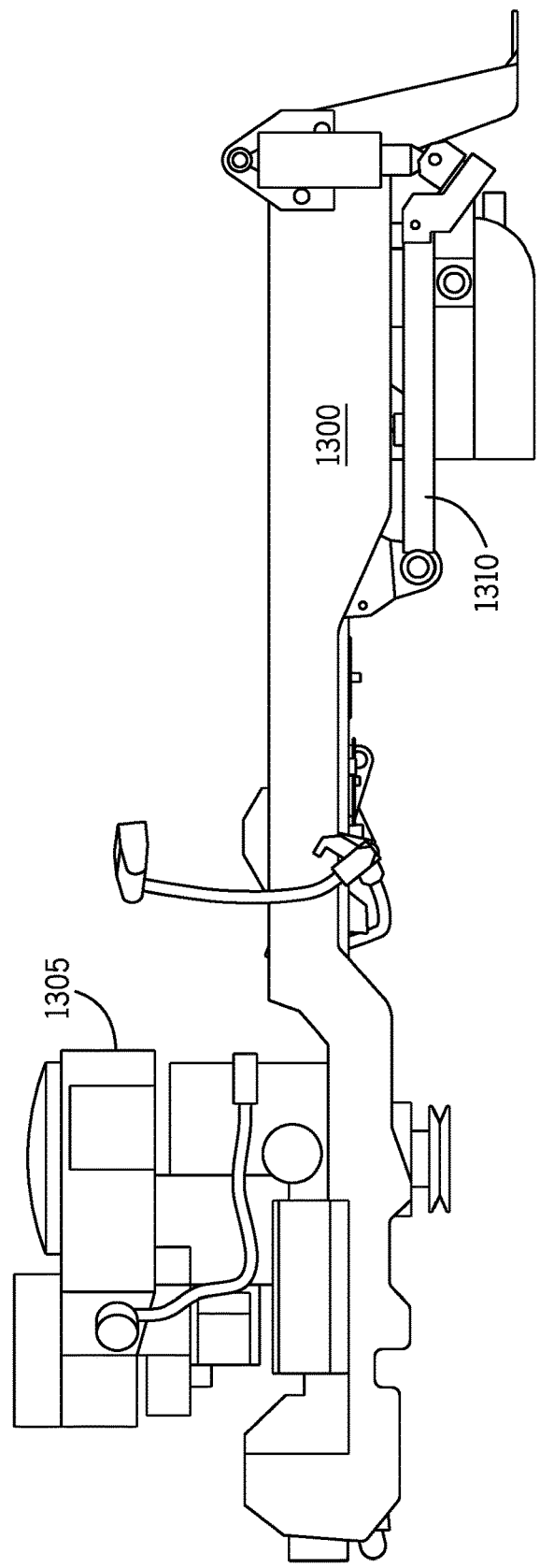
FIG. 13 is a rendering showing a side view of a mower chassis including an engine relative to a rear suspension mechanism and a transmission assembly according to one embodiment of the invention.

FIG. 13 is a rendering showing a side view of the mower chassis 1300 including the engine 1305 relative to the rear suspension mechanism 1310 and the transmission assembly according to one embodiment of the invention. This figure provides generally the same view as that shown in FIG. 12; however, the mower chassis 1300 is shown, which conceals some of the components discussed above.

Figure 14:
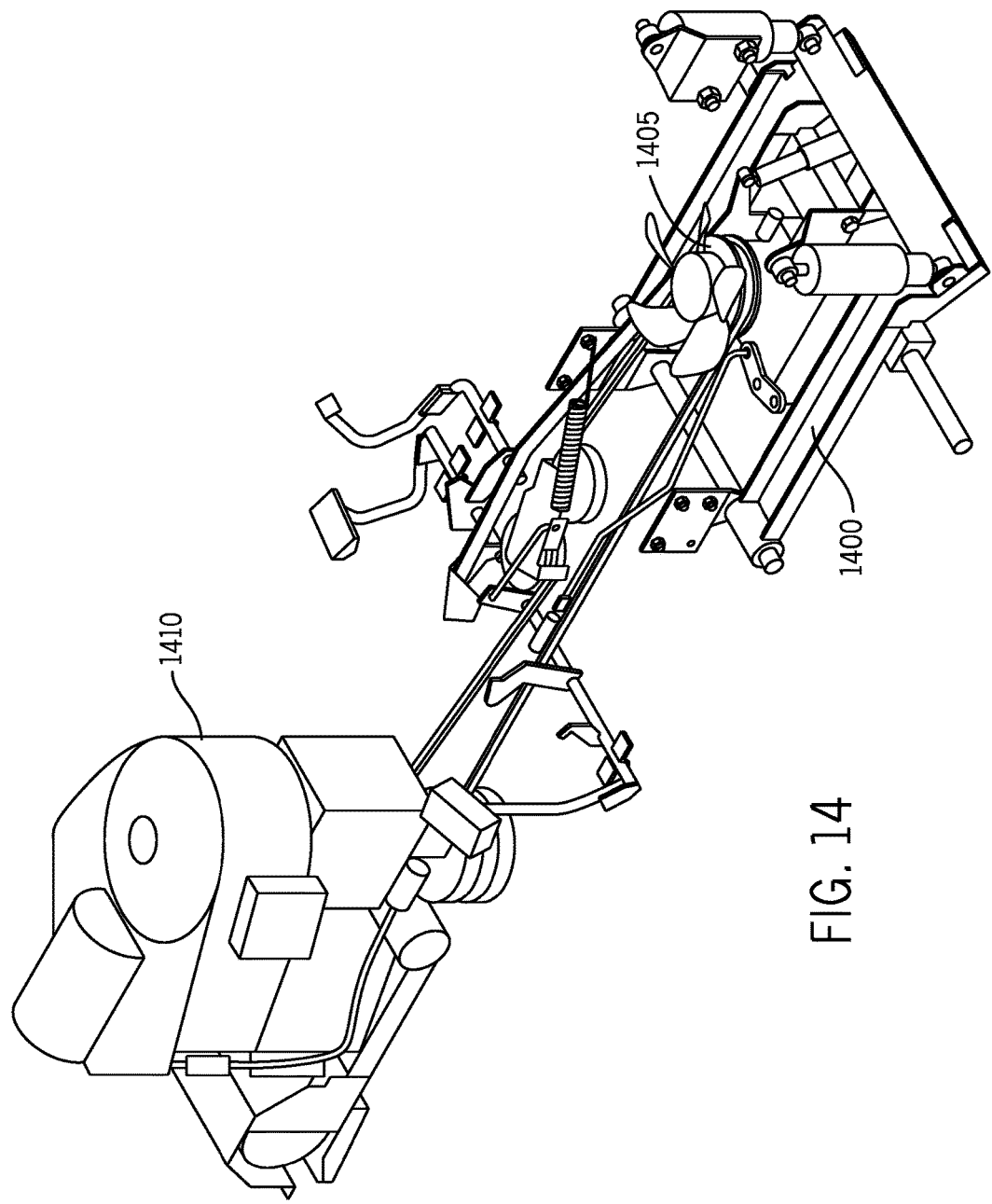
FIG. 14 is a rendering showing a top-angled view of a mower rear suspension mechanism including a transmission assembly relative to an engine according to one embodiment of the invention.

FIG. 14 is a rendering showing a top-angled view of the mower rear suspension mechanism 1400 including the transmission assembly 1405 relative to the engine 1410 according to one embodiment of the invention. This view provides a perspective view of the engine 1410 relative to the rear suspension assembly 1400 and transmission 1405.

Figure 15:
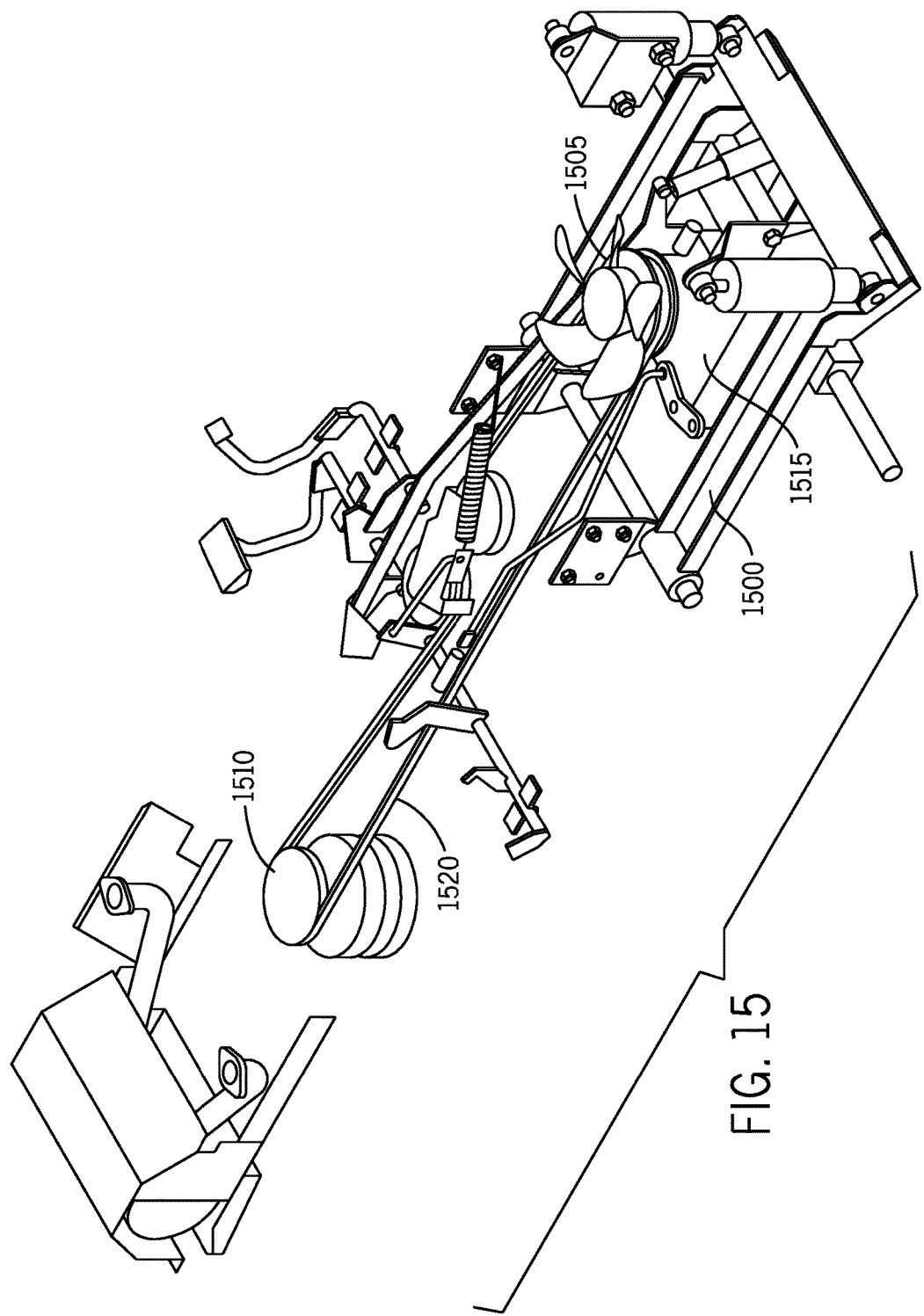
FIG. 15 is a rendering showing a top-angled view of a mower rear suspension mechanism including a transmission assembly relative to an engine pulley according to one embodiment of the invention.

FIG. 15 is a rendering showing a top-angled view of the mower rear suspension mechanism 1500 including the transmission assembly 1505 relative to the engine pulley 1510 according to one embodiment of the invention. The transmission input pulley 1515 can receive power from the mower engine drive pulley 1510. In some embodiments, the transmission input pulley 1515 can be positioned a distance away from the engine drive pulley 1510 so that relatively small variances in the vertical position of the pulley 1515 (i.e., due to movement of the suspension assembly 1500) does not significantly alter the horizontal belt 1520 angle.

Figure 16:
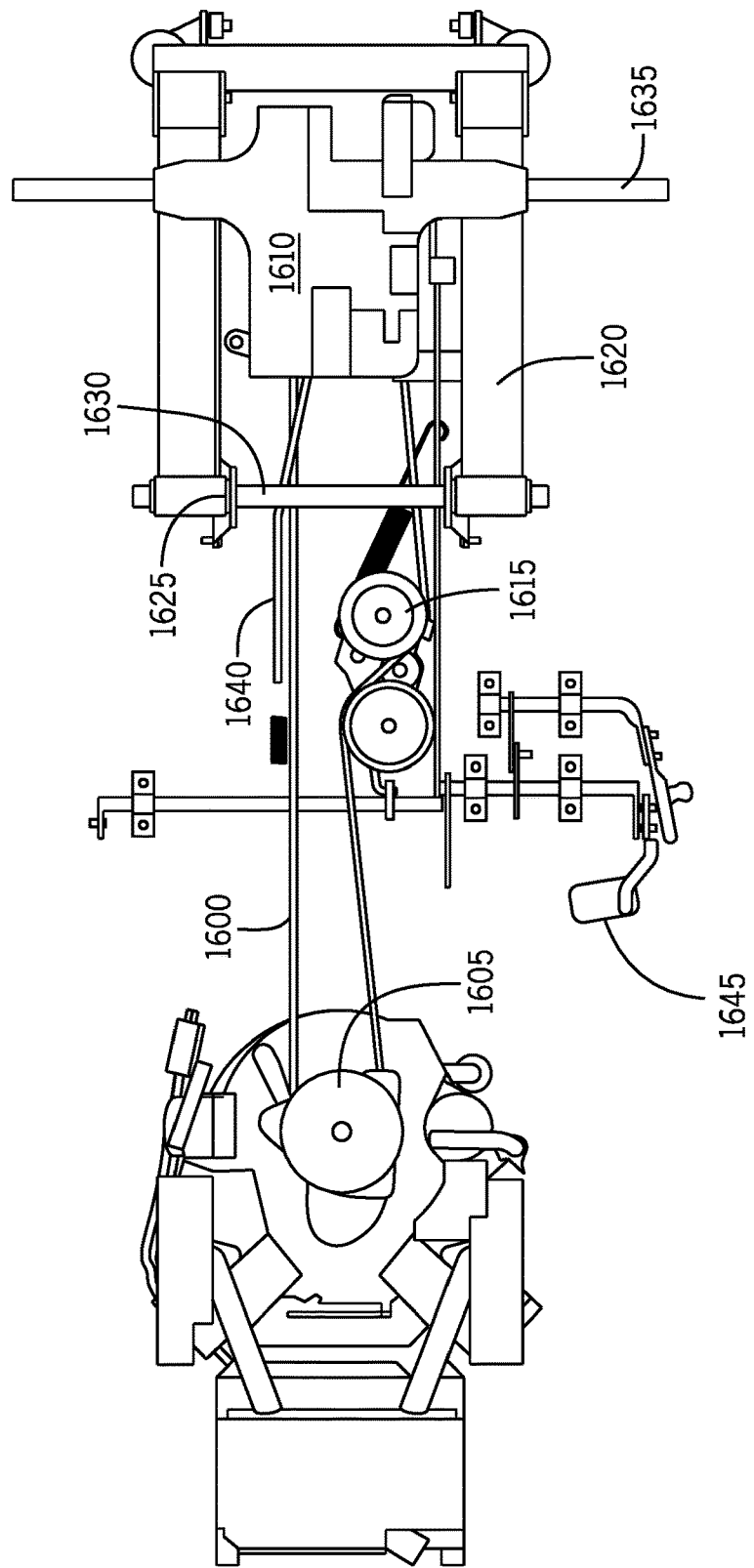
FIG. 16 is a rendering showing a top-down view of a mower engine relative to a rear suspension mechanism including a transmission assembly according to one embodiment of the invention.

FIG. 16 is a rendering showing a top-down view of the mower engine relative to the rear suspension mechanism 1620 including the transmission assembly 1610 according to one embodiment of the invention. The path of the dive belt 1600 is illustrated relative to the engine drive pulley 1605 and the transmission input pulley, which is obscured by the transmission 1610. As previously mentioned, in some embodiments, the drive belt tensioner assembly 1615 can ensure that the belt 1600 maintains a constant tension despite the position of the transmission input pulley. The rear suspension assembly 1620 can be pivotally connected to the mower chassis using the bushings 1625 and dowel pin 1630.

In some embodiments, the transmission 1610 can include a drive shaft 1635 that can be part of the drive train. Various configurations are possible for positioning a transmission relative to the engine and axle. For example, the axle can be physically separated from the transmission and power may be transferred from the transmission to the axle by way of a drive shaft and differential. However, in scenarios where space is limited, a single transmission 1610 with an integrated axle 1635 can provide an acceptable configuration.

In some embodiments, a control arm 1640 can extend from a set of operator controls 1645 to the transmission 1610 in order to provide control to the transmission 1610, so that the direction and speed of the mower can be controlled. The operator controls 1645 can include, for example, a clutch and gear selector, which can allow the operator to control mower speed and torque by causing the transmission 1610 to dynamically switch between gearing ratios.

Figure 17:
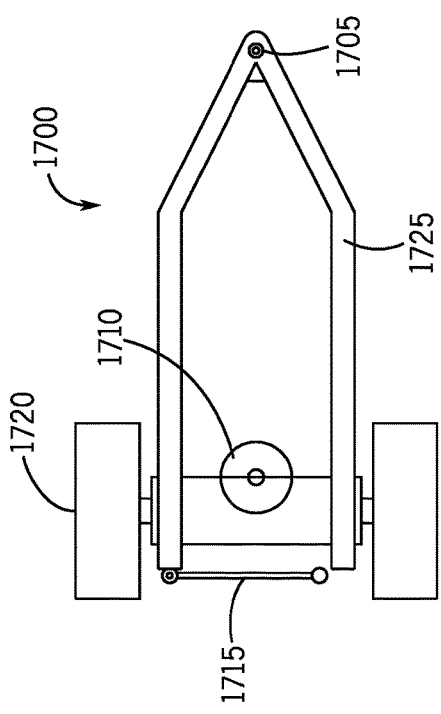
FIG. 17 is a rendering showing a top-down view of a single point pivot rear suspension mechanism including a transmission assembly for a mower according to one embodiment of the invention.

FIG. 17 is a rendering showing a top-down view of a single-point pivot rear suspension mechanism including the transmission assembly for a mower according to one embodiment of the invention. For example, the support brackets 1725 of the rear suspension assembly 1700 can be angled inward to meet at a central point where an attachment assembly 1705 is configured to couple together the rear suspension assembly 1700 and the mower chassis.

In some embodiments, the rear suspension assembly 1700 can be attached to the chassis by a single pivot point 1705. Moreover, the pivot point 1705 can allow a range of motion for the rear suspension assembly 1700. The pivot point 1705 can comprise a ball-and-socket style attachment or a bushing and dowel pin assembly. In some embodiments, the single pivot point 1705 can enable the rear axle to move (e.g., rotate) about the centerline of the mower chassis, which can enable the tires 1720 on the axle to be in contact with the ground surface during operations of the mower, including when the grade for one tire 1720 is different than the grade for the other tire 1720.

In some embodiments, the rear suspension assembly 1700 can be configured and arranged to move vertically as a single unit, as described in the previous embodiments. In some embodiments, sides of the rear suspension assembly 1700 can move vertically and independently of one another because of the pivot point 1705 or single point of connection to the chassis.

While the purpose of the disclosed suspension assemblies can be to allow the centerline of the mower wheels to move vertically with respect to the chassis, it can be undesirable to allow them to move in other directions (e.g., longitudinally and/or laterally). In some embodiments, a support member (e.g., a panhard rod) can be positioned in the same plane as the axle, and it can connect one end of the axle to the chassis on the opposite side of the chassis. The support member can be attached on either end with pivots that permit it to swivel upwards and downwards only, so that the axle is allowed to move in the vertical plane.

Also shown in FIG. 17 is the transmission input pulley 1710, which receives rotational power from the engine by way of a drive belt. The function of the transmission is generally known by those of ordinary skill in the art, but essentially; the transmission converts the kinetic energy received at the transmission input pulley 1710 to the desired and/or needed torque and speed in order to apply the appropriate rotational movement to the axle.

Figure 18:
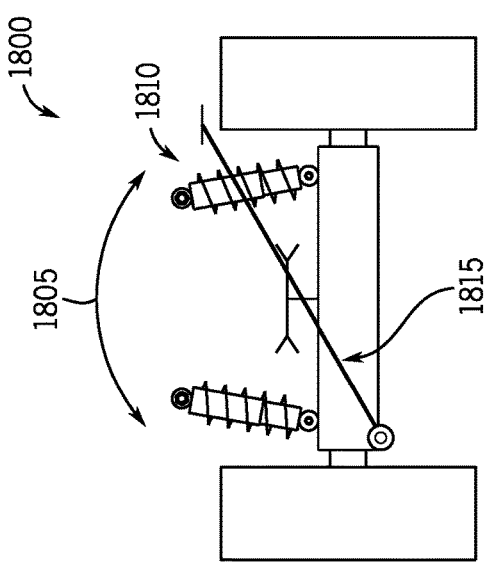
FIG. 18 is a rendering showing a rear view of a single point pivot rear suspension mechanism for a mower according to one embodiment of the invention.

FIG. 18 is a rendering showing a rear view of a single-point pivot rear suspension mechanism 1800 for a mower according to one embodiment of the invention. In some embodiments, the single pivot point can enable the axle to rotate about the centerline of the mower 1805. To increase stability, shock absorbers and/or springs 1810 can be used to provide added stability. In some embodiments, the rear suspension mechanism 1800 can comprise a panhard rod 1815 to provide additional stability. As shown in the figure, a left side of the rod 1815 can be attached to the axle and the right side is attached to the chassis.

Figure 19:
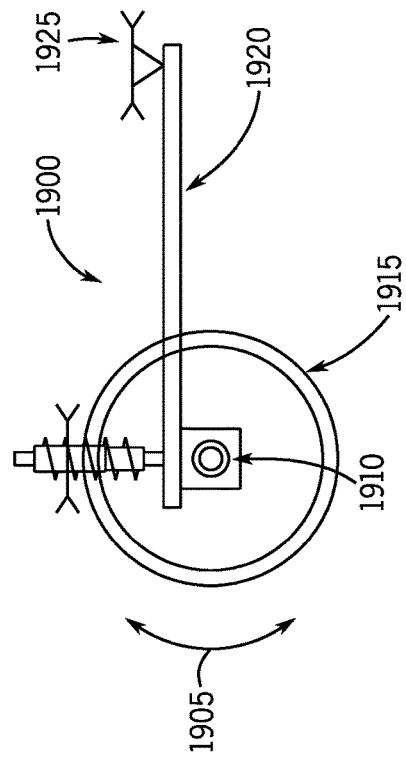
FIG. 19 is a rendering showing a side view of a mower single point pivot rear suspension mechanism with a connecting frame pivot according to one embodiment of the invention.

FIG. 19 is a rendering showing a side view of a mower single-point pivot rear suspension mechanism 1900 with a connecting frame pivot according to one embodiment of the invention. In some embodiments, one or more supports 1920 can be positioned so the supports 1920 begin to angle inward at a point along the length of the supports 1920, so that they meet at a point where a mechanism may secure the suspension assembly 1900 to a connecting bracket 1925 on the mower chassis.

In some embodiments, when a rear tire 1915 encounters an uneven surface, the axle 1910 can be move 1905 (e.g., vertically oscillate). As such, the transmission, which can be suspended by the support brackets, can also vertically oscillate in in substantial or complete synchronicity with the axle.

In some embodiments, this configuration can allow the rear suspension assembly 1900 to absorb the shock of ground surface imperfections, and the operator can be provided with a more comfortable ride and other critical components of the mower are spared life-shortening movements.

Figure 20:
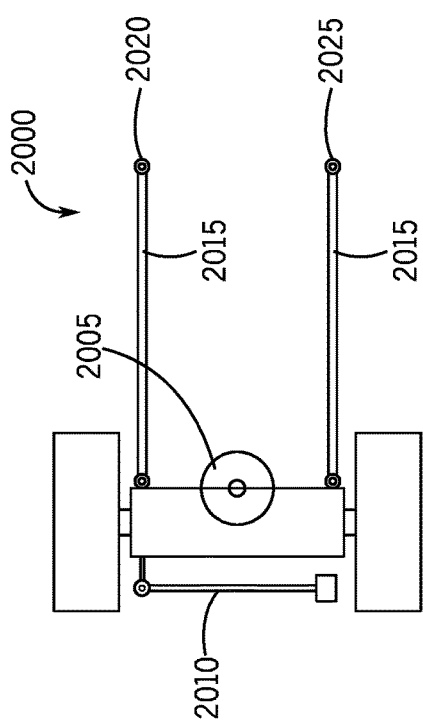
FIG. 20 is a rendering showing a top-down view of a multi-point pivot rear suspension mechanism including a transmission assembly for a mower according to one embodiment of the invention.

FIG. 20 is a rendering showing a top-down view of a multi-point pivot rear suspension assembly 2000 including the transmission assembly for a mower according to one embodiment of the invention. In some embodiments, the support brackets 2015 of the rear suspension assembly 2000 can be independently coupled to a corresponding assembly that can be configured to couple together the rear suspension assembly 2000 and the mower chassis.

In some embodiments, the pivot points can allow a range of motion for the rear suspension assembly 2000 where the rear suspension assembly 2000 is attached to the chassis by multiple pivot points 2020, 2025. In some embodiments, the pivot points can also maintain a more rigid connection to the chassis. One or both of the pivot points 2020, 2025 can comprise a ball-and-socket style attachment or a bushing and dowel pin assembly.

In accordance with some embodiments, the rear suspension assembly 2000 can be configured to move vertically as a single unit, as described in the previous embodiments. The pivot points 2020, 2025 can move vertically and independently from each other. In one embodiment, a pivot point comprising a ball and socket type connection can provide a greater range of motion than the bushing and dowel pin embodiment.

As previously described, although some embodiments of the invention can enable the wheels of the mower to move vertically with respect to the chassis, it can also be undesirable to allow them to move in other directions (e.g., longitudinally and/or laterally). While the multi-pivot point embodiment may further stabilize the rear suspension assembly 2000, in one embodiment, a panhard rod 2010 can be positioned in the same plane as the axle, connecting one end of the axle to the chassis on the opposite side of the chassis. The panhard rod 2010 can be attached on either end with pivots that permit it to move in generally one plane (e.g., upwards and downwards).

Figure 21:
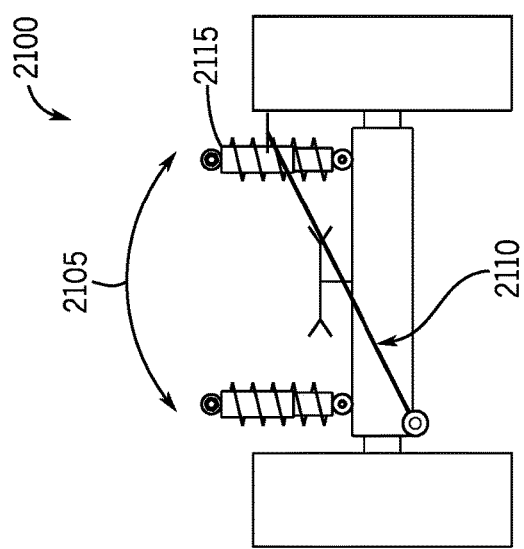
FIG. 21 is a rendering showing a rear view of a multi-point pivot rear suspension mechanism for a mower according to one embodiment of the invention.

FIG. 21 is a rendering showing a rear view of a multi-point pivot rear suspension assembly 2100 for a mower according to one embodiment of the invention. The multiple pivot points 2020, 2025 can allow the axle to rotate about the centerline of the mower 2105. In some embodiments, to increase stability, shock absorbers and/or springs 2115 can be used to provide added stability. Moreover, in some embodiments, as previously mentioned, additional stability may be provided through implementation of a panhard rod 2110. As shown in the figure, the left side of the rod 2110 can attached to the axle and the right side can be attached to the chassis.

Figure 22:
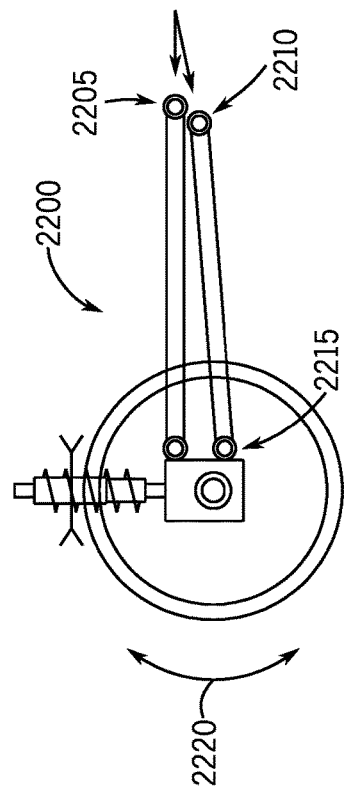
FIG. 22 is a rendering showing a side view of a mower multi-point pivot rear suspension mechanism with a connecting frame pivot according to one embodiment of the invention.

FIG. 22 is a rendering showing a side view of a mower multi-point pivot rear suspension assembly 2200 with a connecting frame pivot according to one embodiment of the invention. In one embodiment, one or more supports are utilized for the rear suspension assembly 2200, but the supports 2205 and 2210 can be mounted individually to the mower chassis.

In one embodiment, when the rear tire 2215 encounters an uneven surface, the axle can move (e.g., vertically oscillate), as reflected by arrow 2220. As such, in some embodiments, the transmission, which is suspended by the support brackets, can also vertically oscillate in unison with the axle. By allowing the rear suspension assembly 2200 to absorb the shock of ground surface imperfections, the operator can be provided with a more comfortable ride and other critical components of the mower are spared life-shortening movements.

Figure 23:
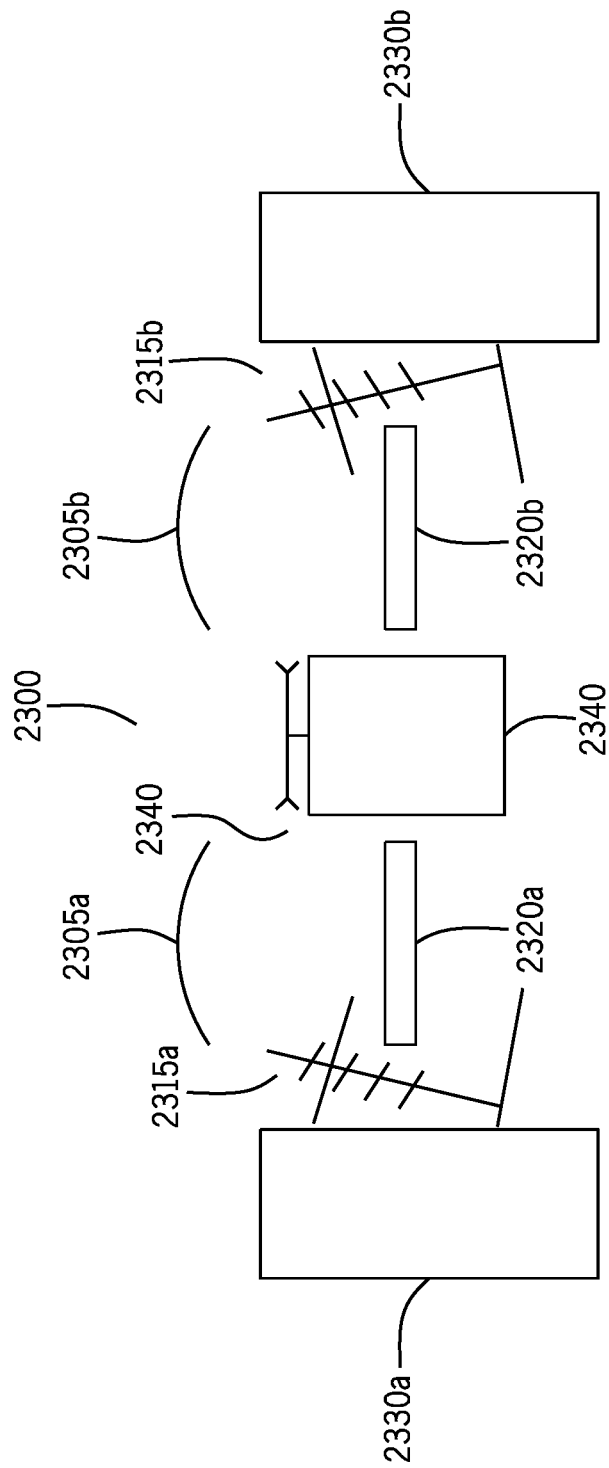
FIG. 23 is a rendering showing a rear view of an independent pivot rear suspension mechanism for a mower according to one embodiment of the invention.

FIG. 23 is a rendering showing a rear view of an independent pivot rear suspension mechanism for a mower according to one embodiment of the invention. In one embodiment, each rear tire 2330*a*, 2330*b* can be independently coupled to the frame mounted transmission assembly 2340. For example, as shown, rear tire 2330*a* can be coupled to the transmission assembly 2340 via a drive axle 2320*a*, and rear tire 2330*b* can be coupled to the transmission assembly 2340 via a drive axle 2320*b*. In some embodiments, each independent drive axle 2305*a* and 2305*b* can be coupled to the rear tires 2330*a*, 2330*b* and transmission assembly 2340 using a flexible joint connection. For example, in some embodiments, the flexible joint connections can comprise a conventional U-joint. In other embodiments, the flexible joint connections can comprise a conventional CV joint. Other embodiments of the invention can utilize other conventional flexible joints suitable for transferring torque to the rear tires 2330*a*, 2330*b*.

In one embodiment, when either rear tire 2330*a*, 2330*b* encounters an uneven surface, either one or both rear tires 2330*a*, 2330*b* can move independently on the their respective axles 2320*a* (shown as oscillation 2305*a* about coil-over shock 2315*a*) and 2320*b* (shown as oscillation 2305*b* about coil-over shock 2315*b*). As such, in some embodiments, the transmission mounted to a frame can remain stationary while either one or more rear tires 2330*a*, 2330*b* can oscillate. By allowing the rear suspension assembly 2300 to absorb the shock of ground surface imperfections independently, the operator can be provided with a more comfortable ride and other critical components of the mower are spared life-shortening movements.

Figure 24:
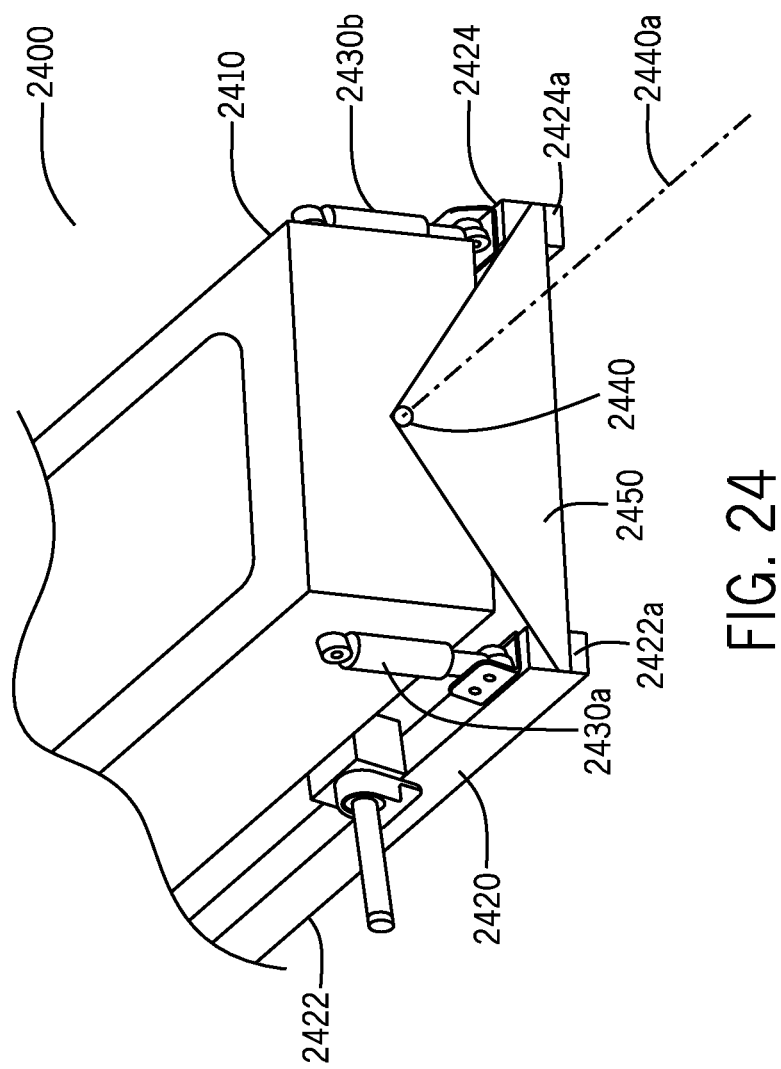
FIG. 24 is a rendering showing a rear view of a parallel pivot axis rear suspension mechanism for a mower according to one embodiment of the invention.

Some embodiments can include rear suspension assemblies with alternative pivot configurations. For example, FIG. 24 is a rendering showing a rear view of a substantially parallel pivot axis rear suspension assembly 2400 for a mower according to one embodiment of the invention. As shown, some embodiments can include a subframe assembly 2420 that pivots on a support axis 2440 substantially parallel to the longitudinal axis of the main frame 2410. In some embodiments, this configuration enables the subframe assembly 2420 to oscillate about the axis 2440*a*. As shown, the assembly 2400 can include a subframe with a first support member 2422 and a second support member 2424. In some embodiments, the subframe assembly 2420 can be coupled to the support axis 2440 using a triangular plate connect or as shown, where the plate 2450 is coupled to the subframe 2420 at a first end 2422*a* of the first support member 2422 and a first end 2424*a* of the second support member 2424 and the main frame 2410 at the support axis 2440. In some embodiments, conventional bars or rods can be substituted for the plate 2450, for example, three conventional rods or bars can be coupled at their ends at the first ends 2422*a*, 2424*a* and the support axis 2440 to form a substantially triangular-shaped coupling between the subframe 2420 and the mainframe 2410 to allow the subframe 2420 to oscillate along about the axis 2440*a*.

Furthermore, the various embodiments of the present invention shown in the figures can include alternate elements and alternate structure that are different in appearance and/or form than those illustrated, but that still perform the same or similar functions. Such alternate elements and structure fall within the spirit and scope of the present invention.

The present invention is also applicable to lawn mowers having more or fewer than four wheels and to lawn mowers designed for the operator to walk or ride behind or in front of the mower. By way of example only, the present invention finds applicability to walk-behind mowers, push mowers, and mowers with seats cantilevered forward or rearward of the front or rear wheels, respectively.

Accordingly, the embodiments described above and illustrated in the figures are presented by way of example only and not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A suspension and drive assembly capable of being coupled to a chassis of a mower, the suspension and drive assembly comprising:
   a first support having a first support first end, wherein a first bushing is coupled to the first support first end;
   a second support having a second support first end, wherein a second bushing is coupled to the second support first end; and
   a transaxle coupled to and supported by the first support and the second support, the transaxle configured and arranged to be driven by a belt coupled to an engine mounted to the chassis of the mower; and
   the first bushing and the second bushing pivotably mounting the transaxle for pivotal rotation with respect the engine, wherein the engine is configured and arranged to drive the transaxle using the belt from a position outside of the suspension and drive assembly as the transaxle pivots with respect to the engine; and
   wherein the chassis supports at least one cutter deck configured and arranged to be driven by the engine; and
   wherein the transaxle is coupled to a support bracket including a shock absorber coupled to the chassis; and
   wherein at least a portion of the transaxle is positioned between two shock absorbers.

2. A suspension and drive assembly capable of being coupled to a chassis of a mower, the suspension and drive assembly comprising:
   a first support having a first support first end, wherein a first bushing is coupled to the first support first end;
   a second support having a second support first end, wherein a second bushing is coupled to the second support first end; and
   a transaxle coupled to and supported by the first support and the second support, the transaxle configured and arranged to be driven by a belt coupled to an engine mounted to the chassis of the mower; and
   the first bushing and the second bushing pivotably mounting the transaxle for pivotal rotation with respect the engine, wherein the engine is configured and arranged to drive the transaxle using the belt from a position outside of the suspension and drive assembly as the transaxle pivots with respect to the engine; and
   wherein the chassis supports at least one cutter deck configured and arranged to be driven by the engine; and
   wherein the transaxle includes an input pulley coupled to the belt.

3. A suspension and drive assembly capable of being coupled to a chassis of a mower, the suspension and drive assembly comprising:
   a first support including a coupled pivot, the pivot comprising a bushing configured and arranged to support pivotal motion of a coupled transaxle;
   a transaxle coupled to the pivot and configured and arranged to be driven by a belt from an engine positioned coupled to the chassis outside of the suspension and drive assembly, wherein the pivot enables pivotal rotation of the transaxle with respect to the engine at least while being driven by the engine, the transaxle coupled to a support bracket including a shock absorber coupled to the chassis; and
   wherein the chassis supports at least one cutter deck configured and arranged to be driven by the engine; and
   wherein at least a portion of the transaxle is positioned between two shock absorbers.

4. A suspension and drive assembly capable of being coupled to a chassis of a mower, the suspension and drive assembly comprising:
   a first support including a coupled pivot, the pivot comprising a bushing configured and arranged to support pivotal motion of a coupled transaxle;
   a transaxle coupled to the pivot and configured and arranged to be driven by a belt from an engine positioned coupled to the chassis outside of the suspension and drive assembly, wherein the pivot enables pivotal rotation of the transaxle with respect to the engine at least while being driven by the engine, the transaxle coupled to a support bracket including a shock absorber coupled to the chassis; and
   wherein the chassis supports at least one cutter deck configured and arranged to be driven by the engine; and
   wherein the transaxle includes an input pulley coupled to the belt.

5. A suspension and drive assembly capable of being coupled to a chassis of a mower, the suspension and drive assembly comprising:
   a first support including a coupled pivot, the pivot comprising a bushing configured and arranged to support pivotal motion of a coupled transaxle;
   a transaxle coupled to the pivot and configured and arranged to be driven by a belt from an engine positioned coupled to the chassis outside of the suspension and drive assembly, wherein the pivot enables pivotal rotation of the transaxle with respect to the engine at least while being driven by the engine, the transaxle coupled to a support bracket including a shock absorber coupled to the chassis; and
   wherein the chassis supports at least one cutter deck configured and arranged to be driven by the engine; and
   wherein the transaxle is positioned between a drive pulley of the engine and the pivot.

6. The suspension and drive assembly of claim 5, wherein the pivot comprises a second bushing coupled to a second support first end.

* * * * *